US010800611B2

(12) United States Patent
Nishino et al.

(10) Patent No.: US 10,800,611 B2
(45) Date of Patent: Oct. 13, 2020

(54) CONTAINER CONVEYOR SYSTEM

(71) Applicant: SHIBUYA CORPORATION, Ishikawa (JP)

(72) Inventors: Yukinobu Nishino, Ishikawa (JP); Koji Kaya, Ishikawa (JP); Kotaro Mitsutani, Ishikawa (JP); Mitsuo Hashimoto, Ishikawa (JP); Noboru Nishimura, Ishikawa (JP)

(73) Assignee: SHIBUYA CORPORATION, Ishikawa (JP)

( * ) Notice: Subject to any disclaimer, the term of this patent is extended or adjusted under 35 U.S.C. 154(b) by 0 days.

(21) Appl. No.: 16/395,706

(22) Filed: Apr. 26, 2019

(65) Prior Publication Data

US 2019/0329985 A1   Oct. 31, 2019

(30) Foreign Application Priority Data

Apr. 27, 2018   (JP) ................................. 2018-087800
Jun. 7, 2018   (JP) ................................. 2018-109256

(51) Int. Cl.
*B65G 17/32*    (2006.01)
*B65G 17/12*    (2006.01)
(Continued)

(52) U.S. Cl.
CPC .......... *B65G 17/323* (2013.01); *B65G 17/12* (2013.01); *B65G 47/52* (2013.01); *B65G 47/80* (2013.01);
(Continued)

(58) Field of Classification Search
CPC ............................ B65G 47/842; B65G 17/323
See application file for complete search history.

(56) References Cited

U.S. PATENT DOCUMENTS 4,143,754 A * 3/1979 Eldred ...................... B65C 9/06
                                                      156/567
5,137,136 A * 8/1992 Humele .................. B65C 9/065
                                                      156/567
(Continued)

FOREIGN PATENT DOCUMENTS

DE   10 2006 023 531 A1   11/2007
DE   10 2015 224 975 A1   6/2017
(Continued)

OTHER PUBLICATIONS

Extended European Search Report received in Application No. 19171588.7, dated Sep. 11, 2019.

*Primary Examiner* — William R Harp
(74) *Attorney, Agent, or Firm* — Greenblum & Bernstein, P.L.C.

(57) ABSTRACT

A container conveyor system includes a first endless conveyor and a second endless conveyor. The first endless conveyor is provided with a plurality of neck grippers that holds the neck of a capped container and conveys the container held by the neck gripper by moving the neck gripper. The second endless conveyor is provided with a plurality of vertical grippers that comprises an upper grip member, which is liftable and abuts against the top of the cap of the container, and a support plate that supports the base of the container. The second endless conveyor conveys the container held by the upper grip member and the support plate by moving the vertical gripper. The container conveyor system conveys the container by transferring the container between the neck gripper and the vertical gripper.

6 Claims, 23 Drawing Sheets

(51) Int. Cl.
*B65G 47/52* (2006.01)
*B65G 47/80* (2006.01)
*B65G 47/90* (2006.01)

(52) U.S. Cl.
CPC ...... *B65G 47/90* (2013.01); *B65G 2201/0247* (2013.01); *B65G 2812/013* (2013.01)

(56) References Cited

U.S. PATENT DOCUMENTS

| | | |
|---|---|---|
| 6,283,177 B1 | 9/2001 | Naka et al. |
| 7,681,713 B2 * | 3/2010 | Nishi ................... B65G 29/00 198/469.1 |
| 8,627,945 B2 * | 1/2014 | Kramer ................... B65C 9/06 198/470.1 |
| 2002/0185233 A1 | 12/2002 | Ballarotti |
| 2017/0225935 A1 | 10/2017 | Pedercini et al. |

FOREIGN PATENT DOCUMENTS

| | | |
|---|---|---|
| EP | 1 264 771 A1 | 12/2002 |
| JP | 11-322065 A | 11/1999 |
| JP | 4232265 B2 | 12/2008 |
| WO | 2016/020293 A1 | 2/2016 |

* cited by examiner

FIG. 18

| LAP NUM. | | 1ST. LAP | | | | | | | 2ND. LAP | | | | | | | 3RD. LAP | | | | | | |
|---|---|---|---|---|---|---|---|---|---|---|---|---|---|---|---|---|---|---|---|---|---|---|
| HEAD NUM. | | 1 | 2 | 3 | 4 | 5 | 6 | 7 | 1 | 2 | 3 | 4 | 5 | 6 | 7 | 1 | 2 | 3 | 4 | 5 | 6 | 7 |
| ROUTE | | I | II | I | II | I | II | I | II | I | II | I | II | I | II | I | II | I | II | I | II | I |
| P1 | CAM A | DOWN | | DOWN | | DOWN | | | DOWN | | DOWN | | DOWN | | | DOWN | | DOWN | | DOWN | | |
| | CAM B | | DOWN | | DOWN | | DOWN | | | DOWN | | DOWN | | DOWN | | | DOWN | | DOWN | | DOWN | |
| | CAM C | | | | | | | DOWN | | | | | | | DOWN | | | | | | | DOWN |
| P2 | CAM A | DOWN | | DOWN | | DOWN | | | UP | | UP | | UP | | | DOWN | | DOWN | | DOWN | | |
| | CAM B | | UP | | UP | | UP | | | DOWN | | DOWN | | DOWN | | | UP | | UP | | UP | |
| | CAM C | | | | | | | DOWN | | | | | | | UP | | | | | | | DOWN |
| P3 | CAM A | UP | | UP | | UP | | | DOWN | | DOWN | | DOWN | | | UP | | UP | | UP | | |
| | CAM B | | DOWN | | DOWN | | DOWN | | | UP | | UP | | UP | | | DOWN | | DOWN | | DOWN | |
| | CAM C | | | | | | | UP | | | | | | | DOWN | | | | | | | UP |

FIG. 21
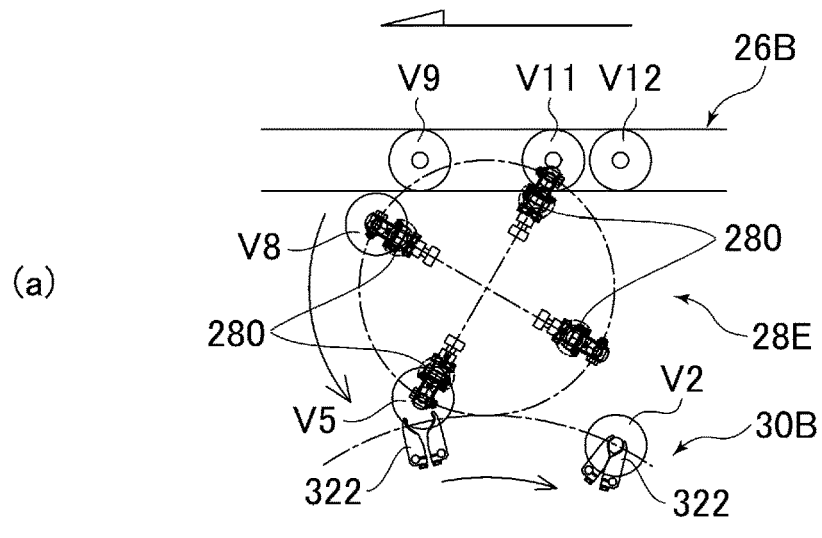
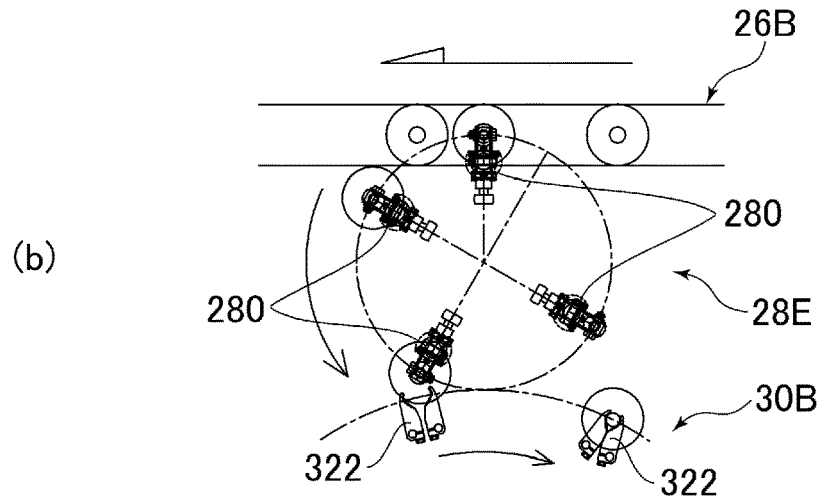
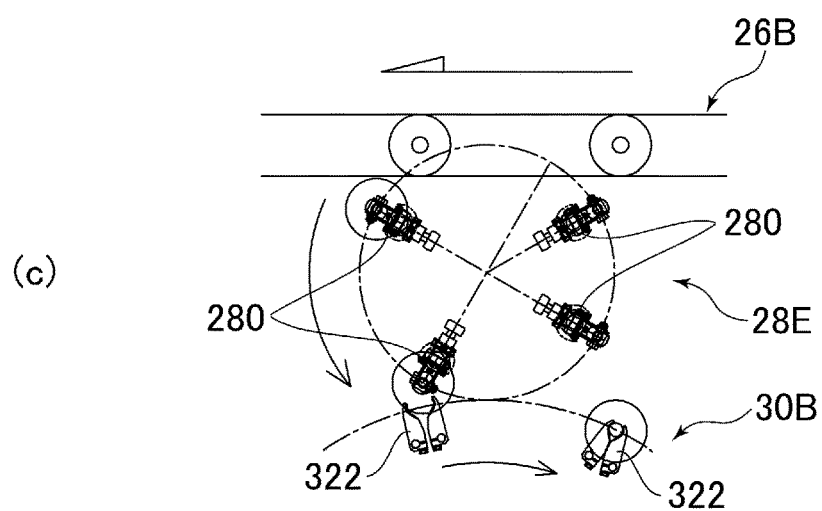

FIG. 22
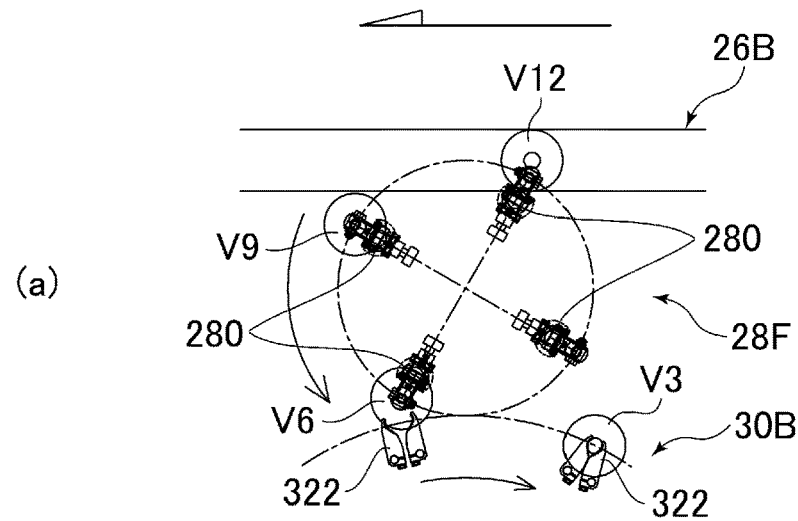
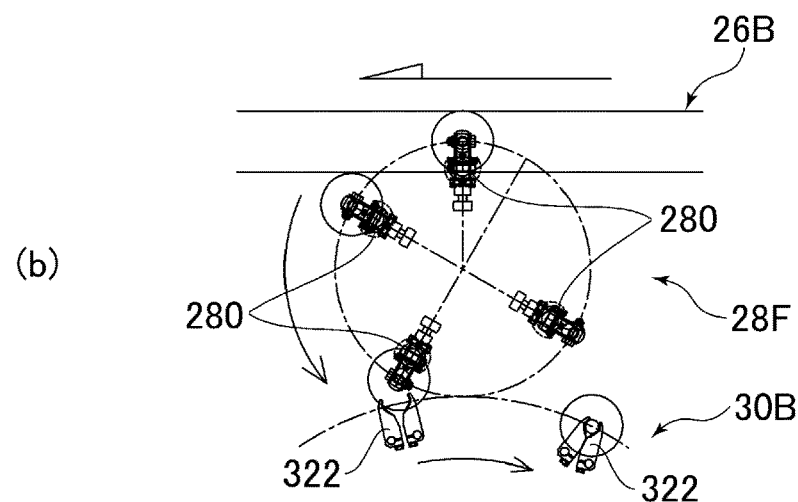
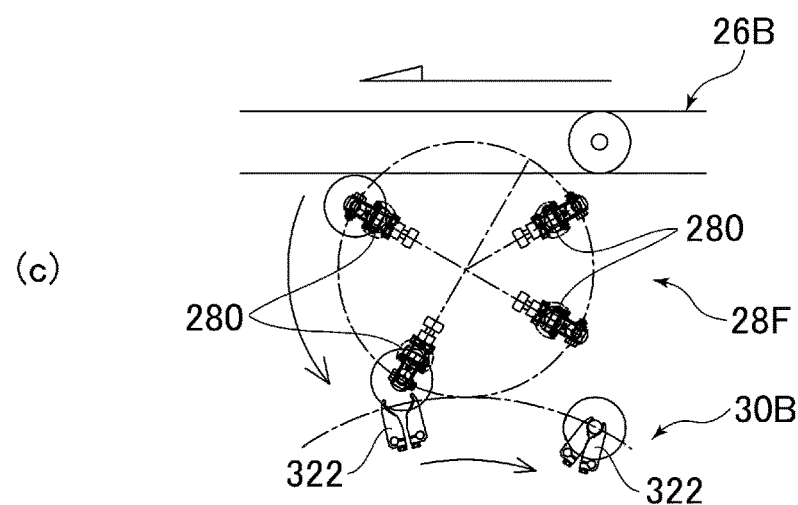

CONTAINER CONVEYOR SYSTEM

BACKGROUND OF THE INVENTION

1. Field of the Invention

The present invention relates to a container conveyor system for transporting capped containers.

2. Description of the Related Art

As a method for transporting bottle-shaped resin containers, a neck-handling system is known that grips a bottle neck or lip with grippers provided on rotary wheels and transports bottles between alternate grippers on neighboring rotating rotary wheels, see Japanese Patent Publication No. 4232265. In the neck-handling system, which transfers a bottle from a gripper on one rotary wheel to a gripper on another rotary wheel, the grippers alternately hold an upper part and lower part of a flange or a collar, which is formed between the neck and the lip of a bottle, to prevent interference between different grippers handling the same bottle. However, once a bottle is capped, there remains only a small space between the cap and the flange, which makes neck-handling difficult because a gripper is not able to hold the upper section of the flange. Accordingly, a conveyor system that transfers the bottles in a standing position on a conveyor surface is often used after the capping process.

SUMMARY OF THE INVENTION

However, a conveyor system, which transports containers on the conveyor surface, needs to adjust or change its guide members whenever the size or shape of the containers is changed. Therefore, when the type or the size of a handling container is changed, there is a big burden on the work site.

One aspect of the present invention is to transport capped containers by gripping containers alternately with grippers.

According to a primary aspect of the present invention, a container conveyor system is provided that includes a first endless conveyor and a second endless conveyor.

The first endless conveyor is provided with a plurality of neck grippers that holds a neck of a capped container and conveys the container held by the neck gripper by moving the neck gripper. The second endless conveyor is provided with a plurality of vertical grippers that comprises an upper grip member, which is liftable and abuts against the top of the cap of the container, and a support plate that supports the base of the container. The second endless conveyor conveys the container held by the upper grip member and the support plate by moving the vertical gripper. The container conveyor system conveys the container by transferring the container between the neck gripper and the vertical gripper.

BRIEF DESCRIPTION OF THE DRAWINGS

The objects and advantages of the present invention will be better understood from the following description with references to the accompanying drawings in which:

FIG. 18 is a table indicating a normal switching operation of the switching wheel;

FIG. 21 is a plan view schematically illustrating an operation of the servo wheel positioned in its second farthest upstream position, receiving the container from the carrier link conveyor;

FIG. 22 is a plan view schematically illustrating an operation of the servo wheel positioned in its farthest downstream position, receiving the container from the carrier link conveyor.

DESCRIPTION OF THE PREFERRED EMBODIMENTS

Figure 1:
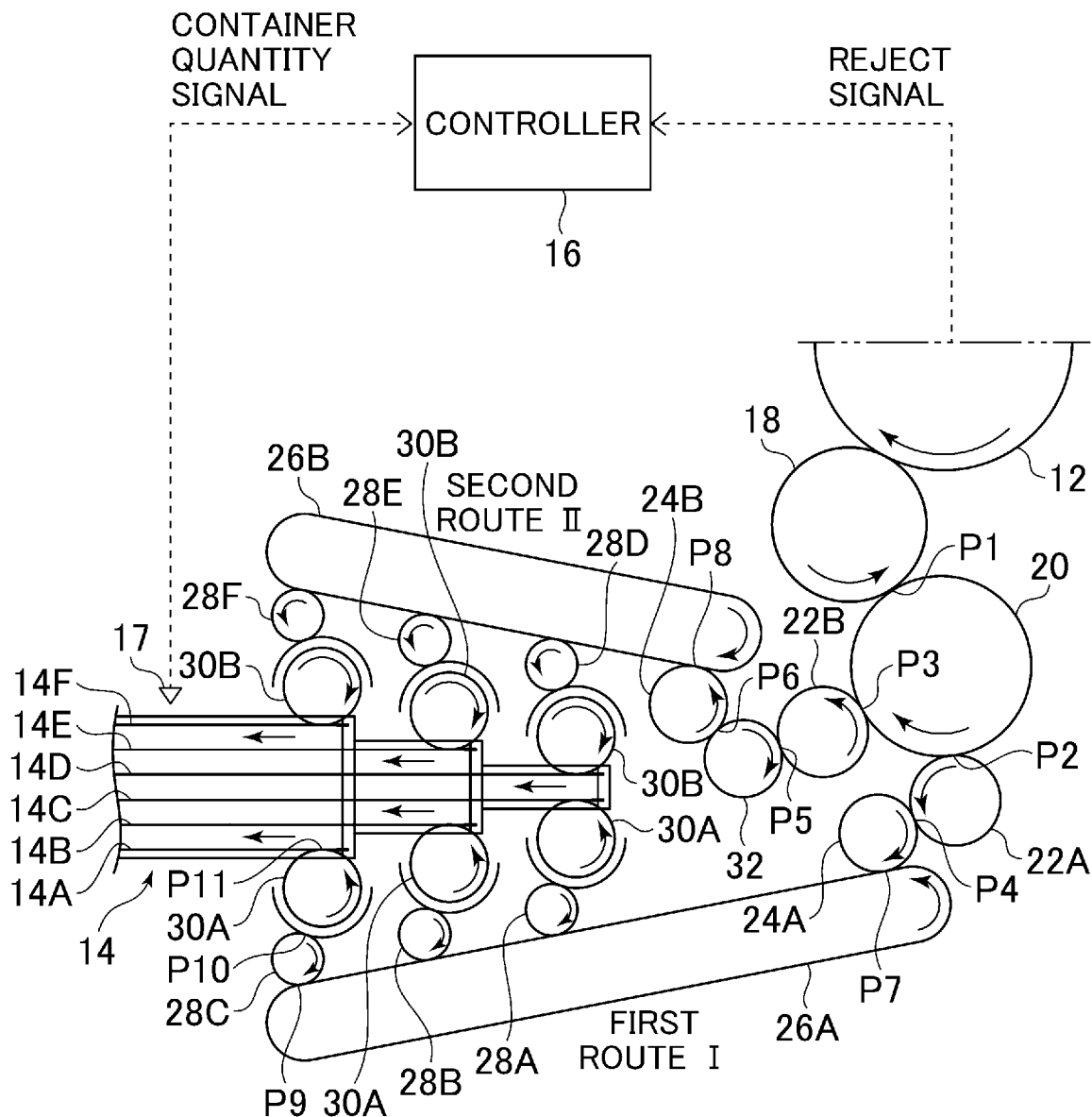
FIG. 1 is a plan view illustrating configurations of part of a container conveyor system of an embodiment of the present invention.

The present invention is described below with references to the embodiments shown in the drawings. FIG. 1 is a plan view illustrating configurations of part of a container conveyor system of an embodiment of the present invention.

The container conveyor system 10 of the present embodiment is a system that transfers containers V, which are filled with content and capped, to a case packer (not shown in drawings). The container (article) V may include a bottle-shaped resin container having a flange Vf on its neck or its lip. FIG. 1 illustrates configurations of part of the container conveyor system 10, i.e., from an inspection wheel 12 that inspects containers V supplied from a capping machine (not shown in drawings) for defecting and rejecting defective containers to an outlet conveyor 14, which is positioned just before the case packer and conveys the containers in multiple lanes in a standing posture on the conveyor surface. Incidentally, when a container V is rejected from the inspection wheel, a rejection signal indicating which container V has been rejected and the rejected container's position are transmitted to a controller 16.

As will be mentioned later, the conveyor system 10 includes vertically gripping wheels and neck gripping wheels. The vertically gripping wheels are provided with a plurality of vertical grippers on the circumference of the wheel and the neck gripping wheels are provided with a plurality of neck grippers on the circumference of the wheel. The vertical grippers grip the top face of the cap Vc and the bottom face of each container V using an upper gripper finger and a lower gripper finger. On the other hand, the neck grippers grip the neck Vn of each container V just below the flange Vf. The containers are conveyed along the periphery of each of the wheels and transferred between the wheels by an alternating mutual exchange between the vertical gripper and the neck gripper. Here, the neck-gripping wheel corresponds to a first endless conveyor referred to in the claims and the vertically gripping wheel corresponds to a second endless conveyor referred to in the claims.

In the present embodiment, the inspection wheel 12 corresponds to the vertically gripping wheel. The containers, which were not rejected from the inspection wheel 12, are transferred to a neighboring inlet wheel 18 corresponding to the neck-gripping wheel, which is synchronously rotated in the opposite direction with respect to the inspection wheel 12. A switching wheel 20 is positioned next to the inlet wheel 18 on the downstream side. The switching wheel 20 is a vertically gripping wheel, which is synchronously rotated in the opposite direction with respect to the inlet wheel 18. The details of the switching wheel will be discussed later.

The switching wheel 20 selectively delivers the conveying containers V to two different routes. The switching wheel 20 holds the containers V by the vertical grippers and conveys along the periphery of the wheel. At a position in a relatively upstream section, the switching wheel 20 may transfer the containers V to a first pitch converting wheel (a first outlet wheel) 22A, which rotates synchronously in the opposite direction with respect to the switching wheel 20. On the other hand, at a position in a relatively downstream section, the switching wheel 20 may transfer the containers V to a first pitch converting wheel (a second outlet wheel) 22B, which rotates synchronously in the opposite direction with respect to the switching wheel 20. Accordingly, the conveyance route is divided into two routes via the switching wheel 20, i.e., a first route "I" that starts from the first pitch converting wheel 22A and a second route "II" that starts from the first pitch converting wheel 22B.

The containers V that are handed over to the first pitch converting wheel 22A of the first route "I" are transferred to a carrier link conveyor 26A via outlet wheel 24A, which is a vertically gripping wheel and is synchronously rotated in the opposite direction with respect to the first pitch converting wheel 22A. The conveyor route of the carrier link conveyor 26A has a long oval shape and a plurality of neck grippers is provided along the periphery. The neck grippers, which grip the containers V, are synchronously conveyed along the periphery of the oval in the opposite direction with respect to the outlet wheel 24A. In the straight section of the oval route, the containers V held by the neck grippers are distributed to three servo wheels 28A, 28B and 28C, in this order from upstream to downstream (detailed later).

Containers V that are received by each of the servo wheels 28A, 28B and 28C are transferred to three second pitch converting wheels 30A, respectively. The second pitch converting wheels 30A are all neck-gripping wheels and are synchronously rotated in the opposite direction with respect to the servo wheels 28A, 28B and 28C. Each of the second pitch converting wheels 30A transfers a container V to each of the corresponding lanes in the outlet conveyor 14 at a regular interval. Thereby, the containers V assigned to the first route "I" are sent out from the outlet conveyor 14 in three lanes.

On the other hand, the containers V transferred via the first pitch converting wheel 22B of the second route "II" are transferred to an outlet wheel 24B, which is a vertically gripping wheel, through a hold-change wheel 32 that is synchronously rotated in the opposite direction with respect to the first pitch converting wheel 22B. As described later, the hold-change wheel 32 includes both vertical grippers and neck grippers. In the present embodiment, the hold-change wheel 32 receives a container V from a neck gripper of the first pitch converting wheel 22B with a vertical gripper 22B and in turn changes the way of holding the container V from vertical gripping to neck gripping, so that the container V can be transferred to vertical gripper on the outlet wheel 24B.

Here, the hold-change wheel 32 is provided for symmetrically lining up the conveying direction (direction of rotation) and gripping direction of the containers V in the first and the second routes "I", "II" with respect to the outlet conveyor 14. Thereby, the containers V can be transferred to the outlet conveyor 14 from the right and left sides in the same manner. Namely, the containers V, which are delivered to the second route "II", are transferred via the outlet wheel 24B to the neck grippers of the carrier link conveyor 26B having a long oval shape. In the straight section of the oval route, the containers V held by the neck grippers are distributed to three servo wheels 28D, 28E and 28F, in this order from upstream to downstream (detailed later).

Containers V that are received by each of the servo wheels 28D, 28E and 28F are transferred to three second pitch converting wheels 30B, respectively. The second pitch converting wheels 30B are all neck-gripping wheels and are synchronously rotated in the opposite direction with respect to the servo wheels 28D, 28E and 28F. Each of the second pitch converting wheels 30B transfers containers V to each corresponding conveyor lane in the outlet conveyor 14 at a regular interval. Thereby, the containers V assigned to the second route "II" are sent out from the outlet conveyor 14 in three conveyor lanes. Namely, the containers V, which are divided into two groups by the switching wheel 20, are separated into six conveyor lanes via three first pitch converting wheels 30A and three second pitch converting wheels 30B and sent out to the case packer through each of six conveyor lanes 14A-14F of the outlet conveyor 14.

Note that the outlet conveyor 14 of the present embodiment, for example, is configured stepwise in bilateral symmetry in the plan view. Two center conveyor lanes 14C and 14D extend to the farthest upstream position and form the first step portion. Each of the second pitch converting wheels 30A and 30B for the respective conveyor lanes 14C and 14D is disposed adjacent to both sides of the first step portion. The conveyor lanes 14B and 14E, which are arranged on either side of the center conveyor lanes 14C and 14D, configure the second step portions. Each of the second pitch converting wheels 30A and 30B for the respective conveyor lanes 14B and 14E is disposed adjacent to the either side of the second step portions. Furthermore, the conveyor lanes 14A and 14F, which are arranged on either side of the conveyor lanes 14B and 14E with four conveyor lanes 14B-14E in between, configure the third step portions. Each one of the second pitch converting wheels 30A and 30B for the respective conveyor lanes 14A and 14F is disposed adjacent to ire either side of the third step portions.

The distances between the pairs of second pitch converting wheels 30A and 30B, which are arranged on either side of each step portion, increase from the first to third step portions. Therefore, six servo wheels 28A-28F, which are arranged beside the second pitch converting wheels 30A and 30B, and the carrier link conveyors 26A and 26B, are arranged in V-shape. The controller 16 uses a sensor 17 to monitor the quantity of containers V conveyed by each of the conveyor lanes 14A-14F of the outlet conveyor 14. As will be discussed later, signals from the sensor 17, for example, are transmitted to the controller 16 as a container quantity signal and the switching operation at the switching wheel 20 may be controlled based on a status determined from the container quantity signal.

Figure 2:
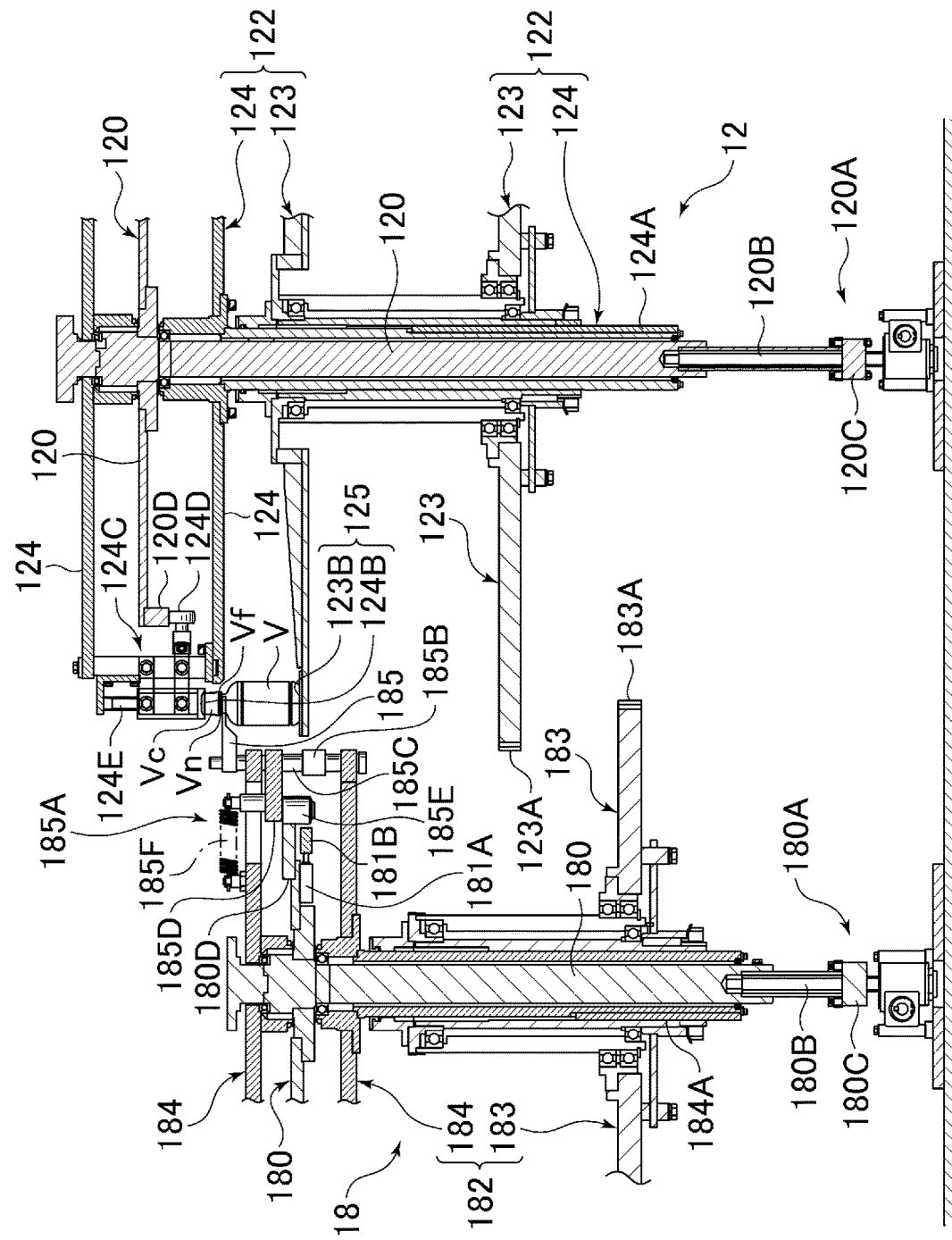
FIG. 2 is a partial sectional view of the inspection wheel and the inlet wheel which transfers the containers.

FIG. 2 is a partial sectional view of the inspection wheel 12 and the inlet wheel 18, between which the containers V are transferred.

The inspection wheel 12, which is a vertically gripping wheel, includes a rotating body 122 that is rotatably supported about a liftable shaft 120, which is supported movably in the vertical direction. The rotating body 122 includes a fixed rotating section 123, which is rotatable while vertically fixed, and a liftable rotating section 124 that is lifted or lowered integrally with the liftable shaft 120. The liftable shaft 120 may be lifted by a lift mechanism 120A, which may include a screw jack provided on the base end of the liftable shaft 120. The lift mechanism 120A may be configured by a nut 120C provided on the bottom end of the liftable shaft 120 and an upright ball screw 120B screwed thereinto. Note that the height of the liftable shaft 120, which in turn is the height of the liftable rotating section 124, is adjusted according to the height of the container V being handled.

The liftable rotating section 124 is rotatably attached about the liftable shaft 120 through a bearing and the like. Further, the liftable rotating section 124 has a spline mechanism 124A along its axis with which the fixed rotating section 123 engages. The fixed rotating section 123 includes a gear 123A that is rotated about the liftable shaft 120 by a motor (not shown) and support plates (a lower gripper finger) 123B that support the bottom of containers V, which rotate together with the gear 123A. The rotation of the gear 123A is transmitted to the liftable rotating section 124 via the spline mechanism 124A. On the other hand, the upward and downward motion of the liftable rotating section 124, which is integrated with the liftable shaft 120, is isolated from the fixed rotating section 123 via the spline mechanism 124A, thereby the position of the fixed rotating section 123 in the vertical direction is fixed.

The plurality of support plates 123B is provided along the periphery of the rotating body 122 at a predetermined interval. Above each support plate 123B, a cap restraint member (an upper gripper finger) 124B that restrains the top face of the cap Vc on a container V from above is arranged. As illustrated in enlarged side elevational views of FIGS. 3A and 3B, each of the cap restraint members 124B is connected to a cam follower 124D via a parallel linking mechanism 124C provided on the liftable rotating section 124. The cap restraint members 124B are biased downward by a biasing member 124E including a spring. Thereby, the cam follower 124D via the parallel linking mechanisms 124C is biased upward so that it is urged onto a cam 120D that is provided around the liftable shaft 120 (i.e., an upper gripper member lifting means).

Figure 3A:
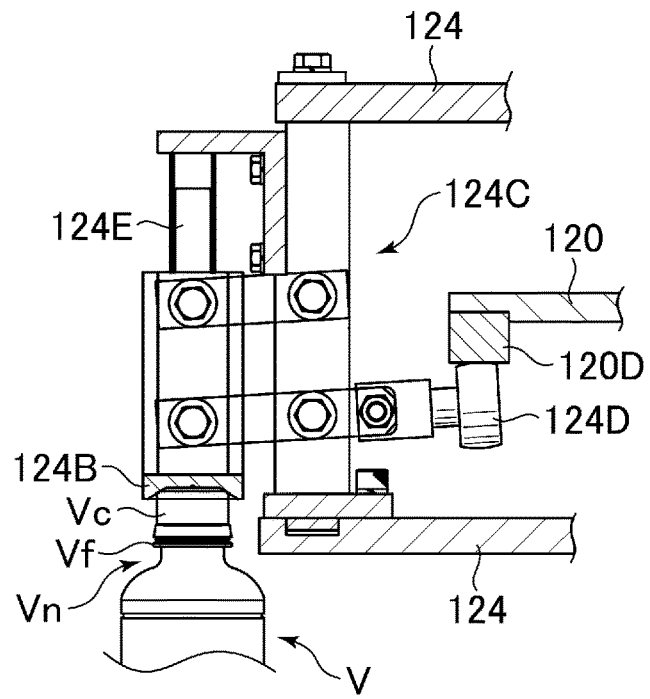
FIGS. 3A and 3B are enlarged elevational views of a drive mechanism of a cap restraint member.
Figure 3B:
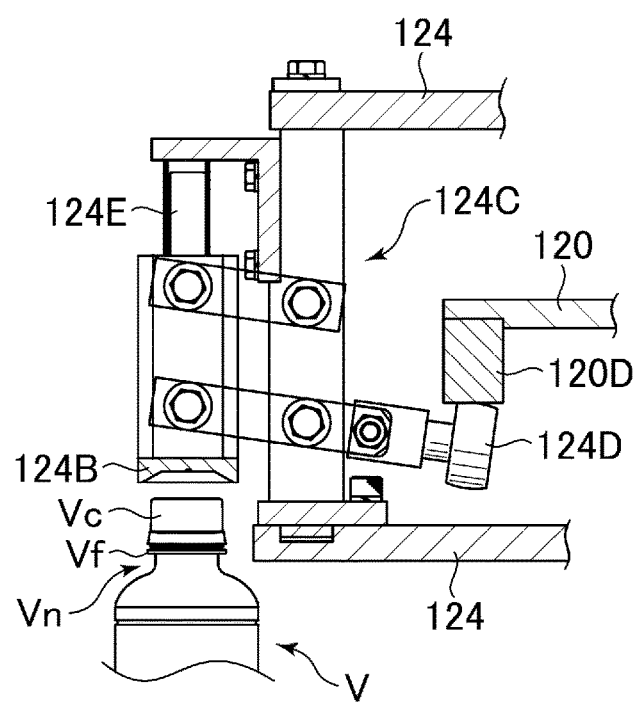

In FIG. 3A, the cam follower 124D is lifted by the engagement with cam 120D and the cap restraint member 124B is urged onto the top face of the cap Vc. On the other hand, in FIG. 3B, the cam follower 124D is lowered by the engagement with the cam 120D and cap restraint member 124B is moved away from the top face of the cap Vc.

Namely, a vertical gripper 125 of the inspection wheel 12, which is a vertically gripping wheel, is configured with the support plate 123B and the cap restraint member 124B. A plurality of vertical grippers 125 is arranged along the periphery of the rotating body 122. The base and the top face of the cap Vc of each container V are gripped by each of the vertical grippers 125 and the container V is conveyed along the circumference of the rotating body 122 while it rotates.

On the other hand, the inlet wheel 18, which is a neck-gripping wheel, includes a rotating body 182 that is rotatably provided about a liftable shaft 180, which is supported movably in the vertical direction. The rotating body 182 includes a fixed rotating section 183 that is rotatable but vertically fixed, and a liftable rotating section 184 that is lifted or lowered integrally with the liftable shaft 180. The liftable shaft 180 may be lifted by a lift mechanism 180A, which may include a screw jack provided on the base end of the liftable shaft 180. The lift mechanism 180A may be configured by a nut 180C provided on the bottom end of the liftable shaft 180 and an upright ball screw 180B screwed thereinto. Note that the height of the liftable shaft 180, which is in turn the height of the liftable rotating section 184, is adjusted according to the height of the container V being handled.

The liftable rotating section 184 is rotatably attached about the liftable shaft 180 through a bearing and the like. Furthermore, the liftable rotating section 184 has a spline mechanism 184A along its axis with which the fixed rotating section 183 engages. The fixed rotating section 183 includes a gear 183A that is rotated about the liftable shaft 180 by a motor (not shown). The rotation of the gear 183A is transmitted to the liftable rotating section 184 via the spline mechanism 184A. On the other hand, the upward and downward motion of the liftable rotating section 184, which is integrated with the liftable shaft 180, is isolated from the fixed rotating section 183 via the spline mechanism 184A, thereby the position of the fixed rotating section 183 in the vertical direction is fixed.

A plurality of neck grippers 185 is provided along the periphery of the liftable rotating section 184 at a predetermined interval. The neck grippers 185 can be opened and closed by a gripper opening/closing mechanism 185A. A neck gripper 185 grips the neck Vn, just below the flange Vf, of a container V that is being held by a vertical gripper 125 of the inspection wheel 12, at the position (a container transfer position) where the inlet wheel 18 approaches the inspection wheel 12. Synchronously, the vertical gripper 125 releases the container V so that the container V gripped by the neck gripper 185 is conveyed along the circumference of the inlet wheel 18 as the liftable rotating section 184 rotates.

The containers V conveyed by the neck grippers 185 are then transferred to the switching wheel 20 at the position (a container transfer position) where the inlet wheel 18 approaches the switching wheel 20.

Figure 4:
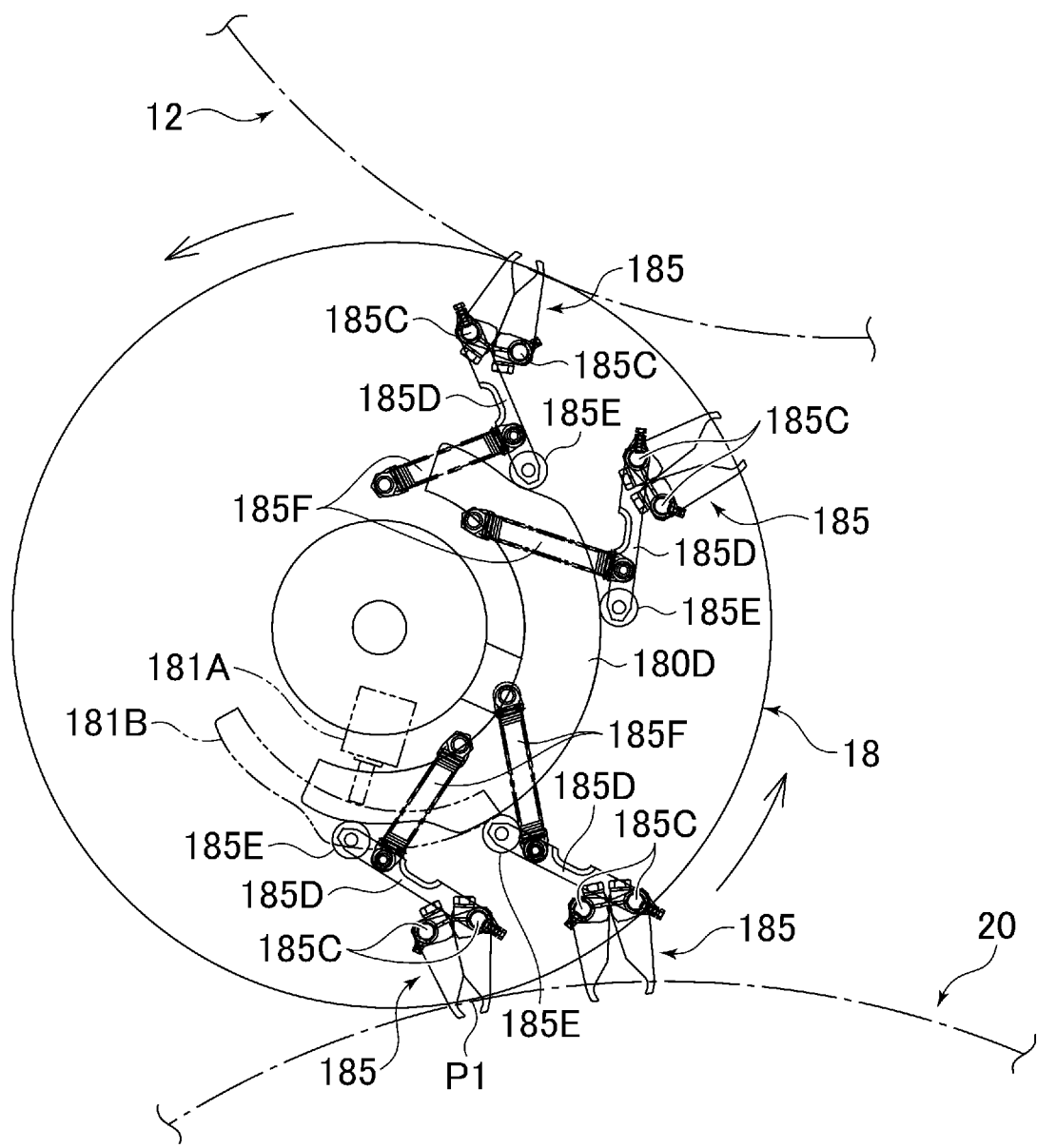
FIG. 4 is a plan view illustrating a part of a gripper opening/closing mechanism of the inlet wheel.

As illustrated in the side elevational view of FIG. 2 and the plan view of FIG. 4, the gripper opening/closing mechanism 185A opens or closes the neck gripper 185 by rotating a pair of rotating shafts 185C that pivotably supports the pair of gripper fingers, respectively, where the rotating shafts 185C are coupled to one another through gears 185B to rotate oppositely. One of the rotating shafts 185C is provided with a lever 185D for rotating the rotating shaft 185C, and a cam follower 185E is attached to the tip of the lever 185D. The lever 185D is biased toward the direction for closing the neck gripper 185 with a biasing member 185F, such as a spring. The cam follower 185E is urged onto a fixed cam 180D on the liftable shaft 180 or a movable cam 181B that is radially shifted by an actuator 181A, such as an air cylinder and the like.

Namely, as the rotating body 182 is rotated, the cam follower 185E runs on the fixed cam 180D or on the movable cam 181B so that the lever 185D is pivoted in accordance with the cam profiles, and in turn, the neck gripper 185 is opened or closed (an opening/closing means). Furthermore, the necks Vn of containers V are gripped just below the flange Vf by the plurality of neck grippers 185 arranged along the periphery of the rotating body 182 and the containers V are conveyed as the rotating body 182 is rotated.

Note that only a part of the gripper opening/closing mechanism 185A is illustrated in FIG. 4 and the cam followers 185E illustrated in FIG. 4 are all engaged with the fixed cam 180D. This corresponds to a situation when the movable cam 181B is retracted radially inward so that the neck grippers 185, which are at the positions (the container transfer position) where the inlet wheel 18 approaches the inspection wheel 12 and the switching wheel 20, are closed by the engagement of the cam followers 180E with the fixed cam 180D. On the other hand, the movable cam 181B that is radially extruded outward is illustrated with two-dot chain lines in FIG. 4. As will be described later, when the movable cam 181B is protruded radially outward, the cam follower 185E at this position engages with the movable cam 181B so that the neck gripper 185 at the position (the container transfer position) where the inlet wheel 18 approaches the switching wheel 20 is opened.

Figure 5:
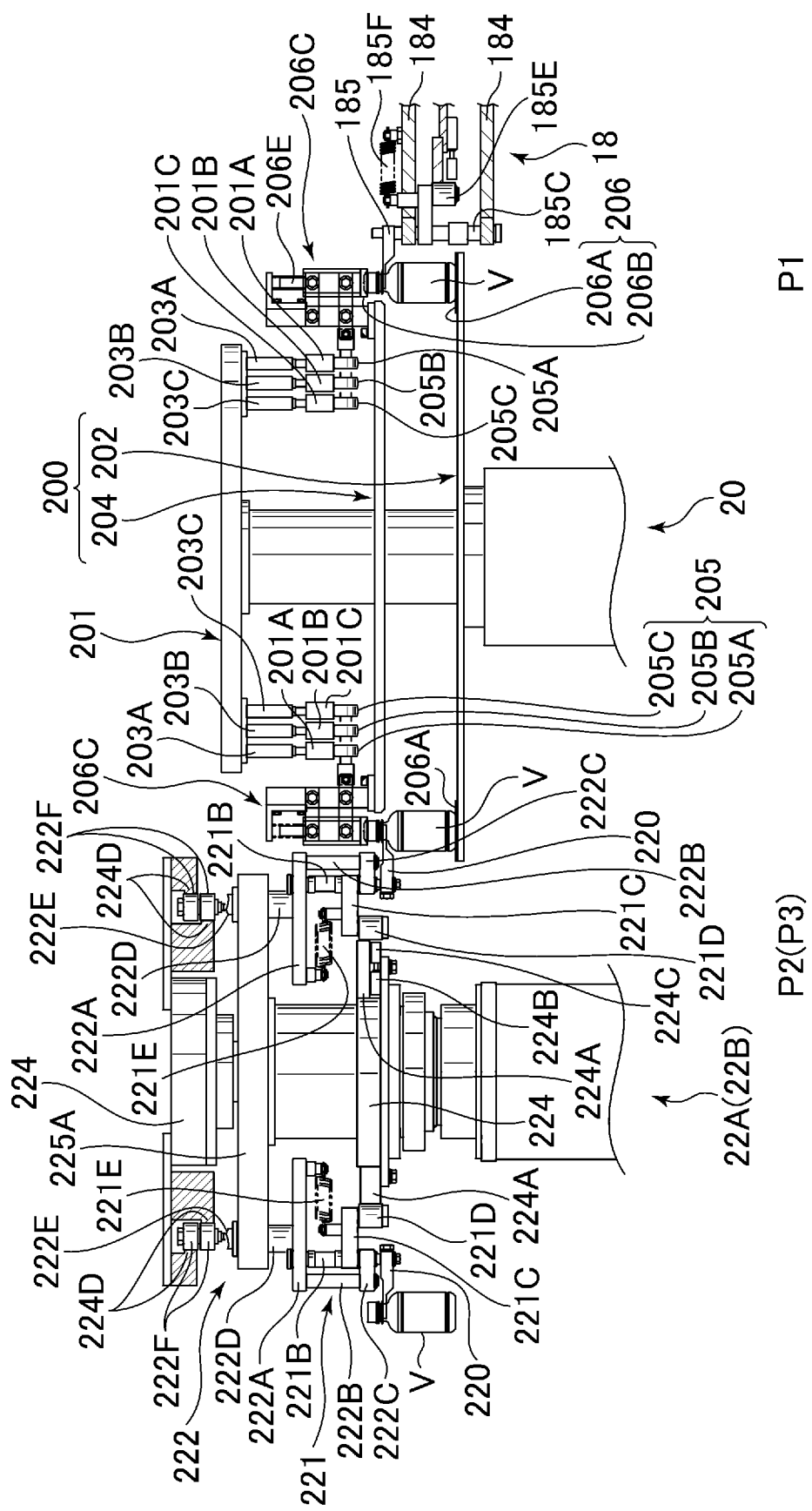
FIG. 5 is a side elevational view of the inlet wheel, the switching wheel and the first pitch converting wheel at each of the container transfer positions.
Figure 7:
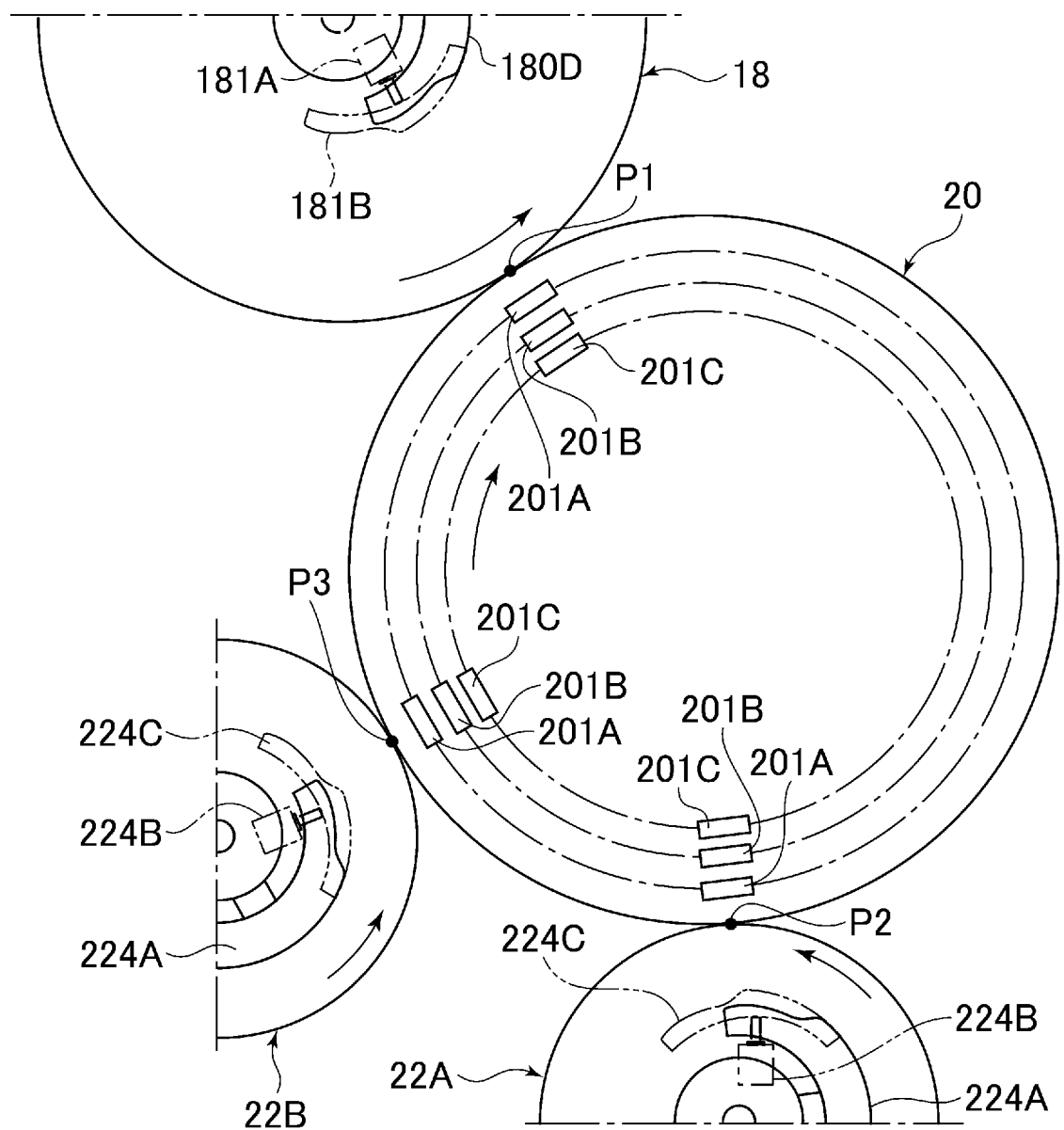
FIG. 7 is a plan view illustrating an arrangement of the container transfer positions and cams of the switching wheel.
Figure 8:
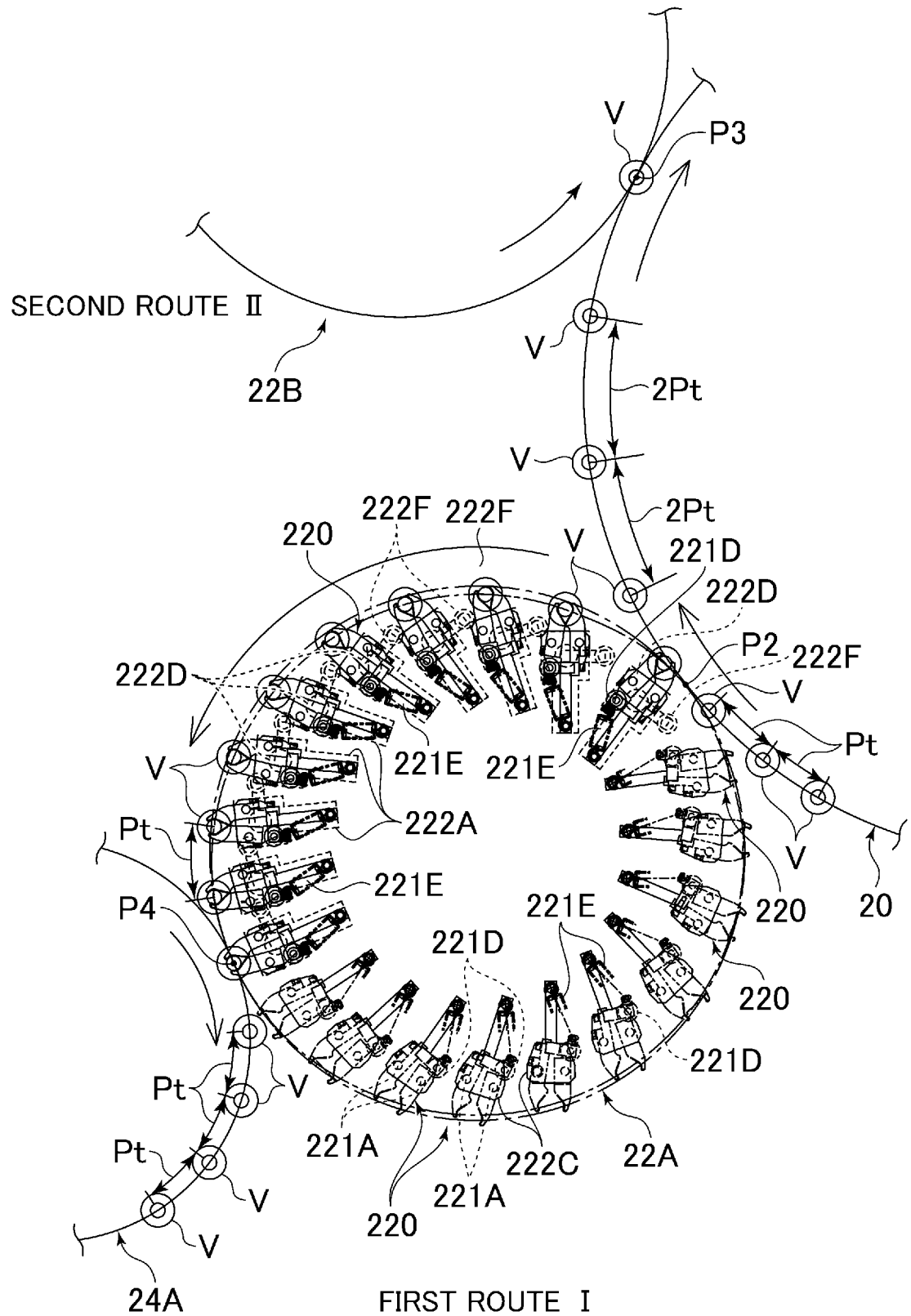
FIG. 8 is a plan view illustrating the movement of the neck grippers of the first pitch converting wheel.

Next, with reference to FIG. 5 to FIG. 8, the configuration of the switching wheel 20 and the first pitch converting wheels 22A and 22B will be explained. FIG. 5 is a side elevational view of the inlet wheel 18, switching wheel 20 and the first pitch converting wheel 22A (22B) including the container transfer positions for each wheel. FIG. 6 is an enlarged side elevational view of the vertical gripper of the switching wheel 20 and FIG. 7 is a plan view illustrating the arrangement of the container transfer positions and cams on the switching wheel 20. Furthermore, FIG. 8 is a plan view illustrating positions and postures of the neck grippers on the first pitch converting wheel 22A (22B). Note that because the configurations of the first pitch converting wheels 22A and 22B are substantially the same, in the following descriptions only the configuration of the first pitch converting wheel 22A will be explained.

The switching wheel 20 is a vertically gripping wheel, which means the containers conveyed by the neck grippers 185 of the inlet wheel 18 are gripped with the vertical grippers 206 of the switching wheel 20 at the position (the container transfer position) where the inlet wheel 18 and the switching wheel 20 approach each other, and the containers V are released from the neck grippers 185 of the inlet wheel 18 at the same time. The basic configuration of the vertical gripper 206 of the switching wheel 20 is the same as that of the inspection wheel 12.

Namely, a rotating portion 200 of the switching wheel 20 is rotatably supported about the axis of a fixed section 201 and includes a fixed rotating section 202, in which the vertical position is fixed, and a liftable rotating section 204. On the periphery of the fixed rotating section 202, odd number support plates (lower gripper fingers) 206A are arranged along the circumference of the fixed rotating section 202 at a predetermined interval. Above each of the support plates 206A, a cap restraint member (an upper gripper finger) 206B is arranged so that it abuts against the top face of the cap Vc on a container V. Namely, the support plate 206A and the cap restraint member 206B configure the vertical gripper 206.

A cam follower 205 is connected to the cap restraint member 206B via a parallel linking mechanism 206C provided on the liftable rotating section 204. The cap restraint member 206B is biased downward by a biasing member 206E including a spring. Thereby, the cam followers 205 are biased upward via the parallel linking mechanisms 206C.

The fixed section 201 of the switching wheel 20 is provided with cams 201A, 201B and 201C, which are arranged with a radially inward orientation at each of three positions. The three positions are: a container transfer position P1 where the containers V are transferred between the inlet wheel 18; a container transfer position (a first outlet position) P2 where the containers V are transferred between the first pitch converting wheel 22A; and a container transfer position (a second outlet position) P3 where the containers V are transferred between the first pitch converting wheel 22B. The cams 201A, 201B and 201C are liftable via actuators 203A, 203B and 203C, such as an air cylinder and the like. The actuators 203A, 203B and 203C, for example, are separately driven by the controller 16 (see FIG. 1) so that the cams 201A, 201B and 201C are separately lifted or lowered by the actuators 203A, 203B and 203C. Each of the cams 201A, 201B and 201C, for example, has a reversed trapezoid shape when it is viewed from the center of the switching wheel 20 and thereby each of the cam followers 205A, 205B and 205C is gradually lowered then guided horizontally for a predetermined distance before finally gradually raised.

In the present embodiment, the length of a control lever of the parallel linking mechanism 206C, provided with a cam follower 205, depends on the position of the cap restraint member 206B along the periphery. For example, when seven cap restraint members 206B are provided along the periphery of the fixed rotating section 202 and the members 206B are represented by the numbering from $1^{st}$ to $7^{th}$, the control levers provided with the cam followers 205A of the $1^{st}$, $3^{rd}$ and $5^{th}$ cap restraint members 206B have a length for engaging with the outermost cam 201A. The control levers provided with the cam followers 205A of the $2^{nd}$, $4^{th}$ and $6^{th}$ cap restraint members 206B have a length for engaging with the middle cam 201B. Furthermore, the control levers provided with the cam follower 205A of the $7^{th}$ cap restraint members 206B have a length for engaging with the innermost cam 201C. Note that when the interval (or pitch) between the vertical grippers 206 provided along the periphery of the switching wheel 20 is large enough for one cam to engage with each of the vertical grippers 206 separately, only one cam may be provided for each of the container transfer positions instead of providing three cams 201A, 201B and 201C.

The cam followers 205A, 205B and 205O are pushed against each of the cams 201A, 201B and 201C at the container transfer positions P1, P2 and P3, respectively, by a biasing force caused by the biasing members 206E. Accordingly, the vertical movement of the cap restraint members 206B at the container transfer positions P1, P2 and P3 is controlled by whether the cams 201A, 201B and 201C are in a high position or in a low position (an upper gripper finger lifting means) and in turn the opening and closing operation of the vertical gripper 206 is controlled (an opening/closing means). Namely, the vertical gripper 206 is switchable between the retention state (the closed state), in which the container V is grasped by the closed gripper fingers, and the released state (the open state) in which the gripper fingers are opened to release the container V.

More specifically, the vertical grippers 206 that correspond to the lowered cams are switched from the closed state to the open state at the corresponding container transfer positions P1, P2 and P3, and subsequently, restored to the closed state. For example, when a neck gripper 185 of the inlet wheel is holding a container V, the container V held by the neck gripper 185 is transferred into the space between the opened fingers of the vertical gripper 206, which corresponds to the lowered cam in the container transfer position P1, and then the vertical gripper 206 is switched to the closed state to restrain and receive the container V (see FIG. 2). Furthermore, the vertical gripper 206, which corresponds to either the cams lowered at the container transfer positions P2 and P3, transfers the container V to either of the corresponding first pitch converting wheels 22A or 22B while the state changes from the closed state to the open state. Furthermore, the vertical grippers 206 that correspond to the lifted cams are maintained in the closed state at the corresponding container transfer positions P1, P2 and P3. For example, the vertical gripper 206 that corresponds to a lifted cam at the container transfer position P2 continues gripping the container V at the position P2 so that the container V is not transferred to the first pitch converting wheel 22A. On the other hand, the vertical gripper 206 that corresponds to a lifted cam at the container transfer position P3 continues gripping the container V at position P3 so that the container V is not transferred to the first pitch converting wheel 22B.

Note that in the present embodiment, all of the vertical grippers 206 of the switching wheel 20 are operated to receive the container V from the inlet wheel 18 in the normal mode switching operation so that the containers V, which are retained by the vertical grippers 206, are alternately transferred to the first pitch converting wheel 22A of the first route "I" and the first pitch converting wheel 22B of the second route "II". Namely, every other container V is transferred to either of the first pitch converting wheels 22A and 22B. Furthermore, the switching wheel 20 of the present embodiment includes a switching adjusting mode for regulating the number of containers delivered to each of the routes in accordance with the rejection of the container in the inspection wheel 12 (detailed later).

Figure 6A:
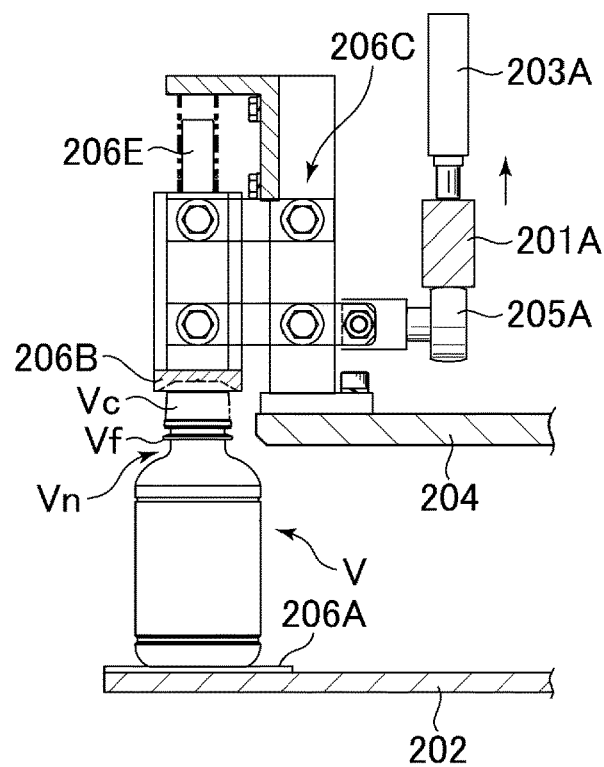
FIGS. 6A and 6B are enlarged side elevational views of a vertical gripper of the switching wheel.
Figure 6B:
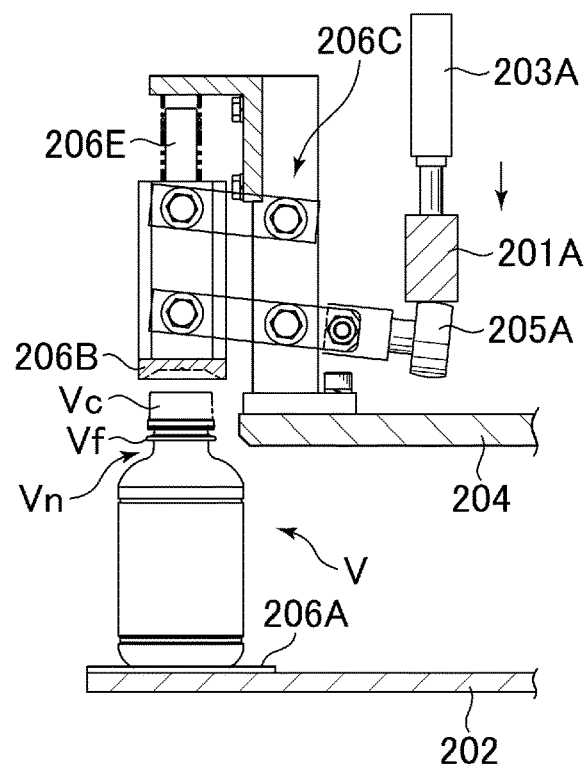

FIGS. 6A and 6B illustrate an enlarged side elevational views of the vertical gripper 206 that is opened and closed via the vertical motion of the outermost cam 201A. In FIG. 6A, the cam 201A is lifted and the cap restraint member 206B is urged onto the cap Vc to restrain the container V by the vertical gripper 206. On the other hand, in FIG. 6B, the cam 201A is lowered and the cap restraint member 206B is detached from the cap Vc so that the container V is released from the vertical gripper 206.

Note that, as described later, the vertical motion of the cams 201A, 201B and 201C is controlled according to the rejection of the container V that occurred in the inspection wheel 12, thereby the number of containers V that are distributed to either of the first route "I" and the second route "II" by the switching wheel 20 is regulated.

The first pitch converting wheel 22A (22B) is a neck-gripping wheel that receives the containers V from the switching wheel. The first pitch converting wheel 22A (22B) is able to change intervals. (pitch) of the neck grippers 220 in the peripheral direction while traveling from the container transfer position P2 (P3), where the containers V are received from the switching wheel 20, to the container transfer position P4 (P5), where the containers V received from the switching wheel 20 are transferred to the outlet wheel 24A (or a hold-change wheel 32), which is arranged on the downstream side (see FIG. 1).

As described above, the switching wheel 20 allocates the containers V to either of the first pitch converting wheels 22A or 22B alternately, with the interval of the containers V at the moment they are transferred to either of the first pitch converting wheels 22A or 22B being twice the original reference interval Pt. Therefore, the neck grippers 220 of the first pitch converting wheels 22A and 22B are moved at a 2*Pt interval, i.e., double the reference interval Pt, at the container transfer positions P2 and P3 where the containers V are received from the switching wheel 20, while their intervals, for example, are restored to the reference interval Pt by turning the gripper's direction before it reaches the container transfer position P4 and P5 where the containers V are transferred to the downstream wheels 24A and 32.

In addition to a gripper opening/closing mechanism 221 for the neck gripper 220, the first pitch converting wheel 22A (22B) further includes a gripper swing mechanism 222 for varying the interval between the neck grippers 220.

The gripper opening/closing mechanism 221 is mounted on a swing plate 222A of the gripper swing mechanism 222. Namely, one end of a pair of rotating axes 221 that is used to open and close the fingers of the neck gripper 220 are each rotatably supported by the swing plate 222A while the side of the other end to which the gripper fingers are attached is rotatably supported by a rotating support member 222C fixed to the swing plate 222A via a connecting member 222B. The rotating axes 221 are engaged to one another by a pair of gears 221B rotating in opposite directions so that the neck gripper 220 is opened and closed.

A lever 221C for rotating the rotating axes 221A is attached to one of the rotating axes 221A and a gripper opening/closing cam follower 221D is provided on the tip end of the lever 221C. One end of a biasing member 221E, such as a spring and the like, is fixed to the swing plate 222A and the other end is connected to the lever 221C to bias the neck gripper 220 in the closing direction. Furthermore, by this biasing force, the gripper opening/closing cam follower 221D is pushed against either a fixed cam 224A on the fixed shaft 224 of the wheel or a movable cam 224C that is radially movable by an actuator 224B, such as an air cylinder and the like.

Note that the movable cam 224C is positioned at the container transfer positions P2 and P3. When the movable cam 224C is protruded radially outward, the gripper opening/closing cam follower 221D is pushed against the movable cam 224C so that the neck gripper 220 maintains the open state at the container transfer positions P2 and P3 and does not receive the container V from the switching wheel 20.

The swing plate 222A is supported by a rotating shaft 222D that is journaled on the liftable rotating section 225A of the first pitch converting wheel 22A (22B). The swing plate 222A is rotated about the rotating shaft 222D as it rotates, and thereby the direction of the swing plate 222A is varied such as the direction of the neck gripper 220. A swing lever 222E is connected to the top end of the rotating shaft 222D and a swing cam follower 222F is provided on the tip end of the swing lever 222E. The swing lever 222E engages with a cam 224D provided on the periphery of the fixed shaft 224 of the wheel. When the liftable rotating section 225A rotates, the swing cam follower 222F moves along the cam 224D, and thereby, the rotating shaft 222D is rotated with the swing plate, such that the neck gripper 220 is turned to vary the interval between the neck grippers 220.

Figure 9:
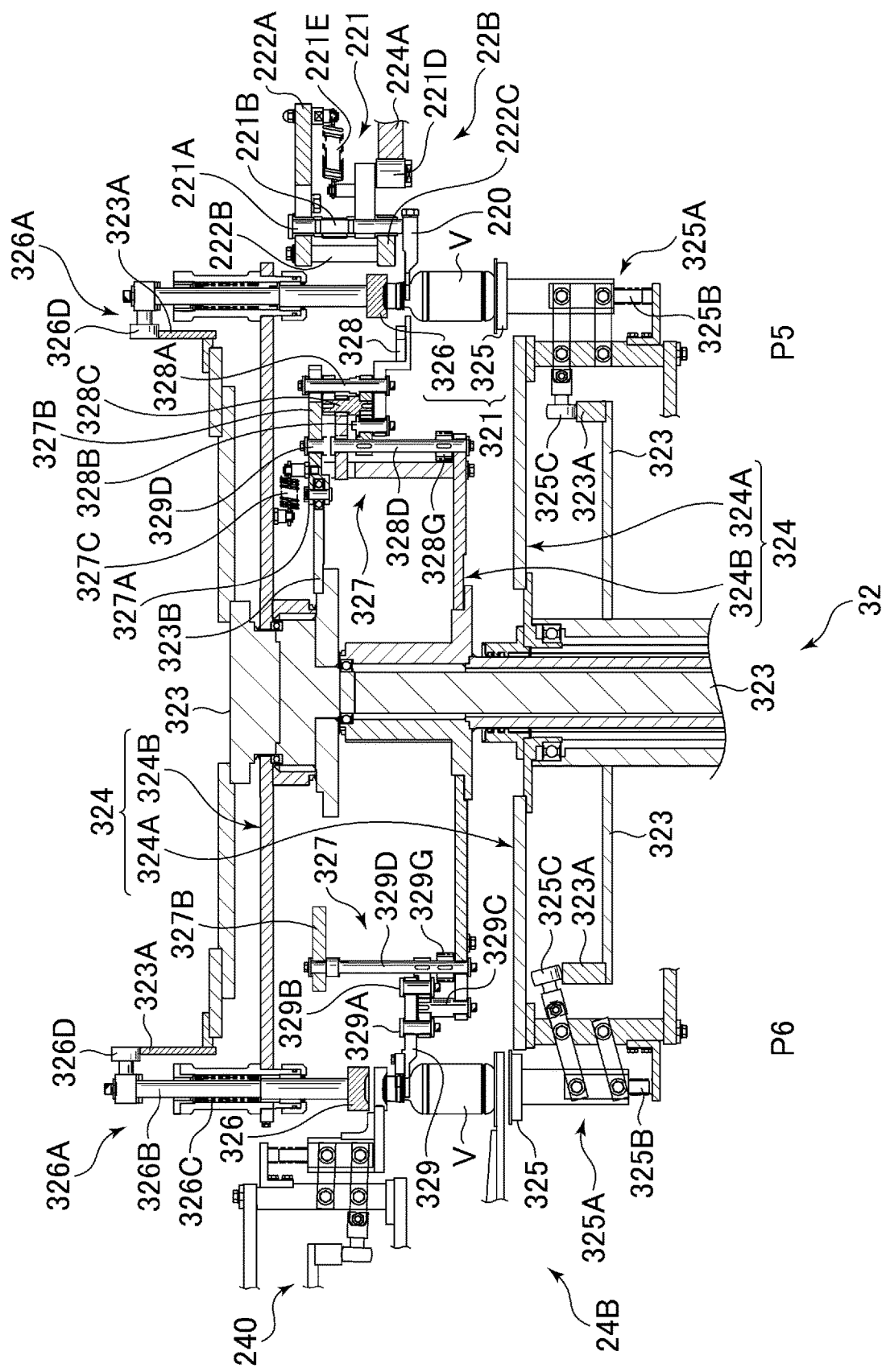
FIG. 9 is a side sectional view of the hold change wheel at the container transfer positions P5 and P6.
Figure 10A:
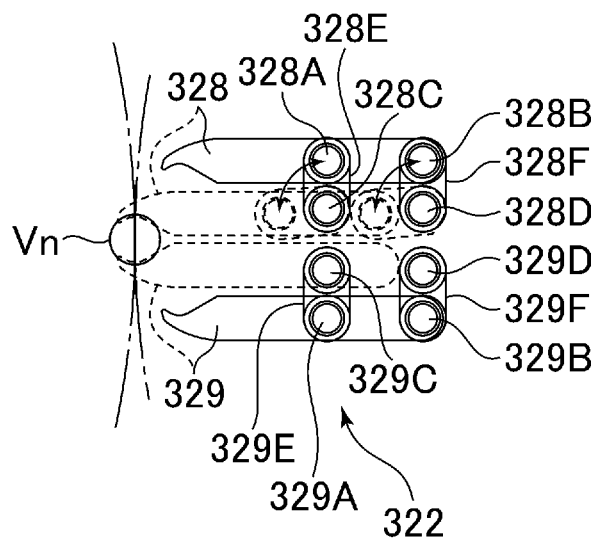
FIGS. 10A and 10B are plan views illustrating the configuration and movement of the neck gripper of the hold change wheel.
Figure 10B:
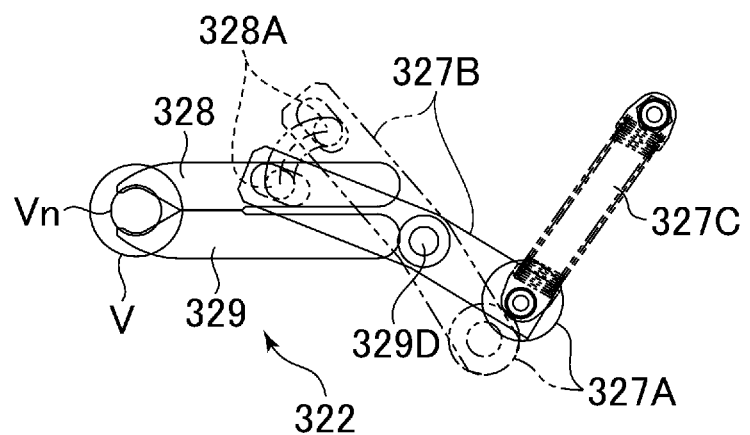

Next, with reference to FIG. 9, FIGS. 10A and 10B, the configuration of the hold-change wheel 32 of the present embodiment will be explained. Incidentally, FIG. 9 is a sectional view of the hold-change wheel 32 at the container transfer positions P5 and P6 and FIGS. 10A and 10B are plan views illustrating the configuration and operation of a neck gripper provided on the hold-change wheel 32.

The hold-change wheel 32 includes a plurality of vertical grippers 321 arranged along the periphery of a rotating body 324 of the wheel and a plurality of neck grippers 322 corresponding to the vertical grippers 321. The containers V circumferentially conveyed by the neck grippers 220 of the first pitch converting wheel 22B are transferred to the vertical grippers 321 at the container transfer position P5.

The hold-change wheel 32 includes a liftable shaft 323 and a rotating body 324 rotatably supported about the liftable shaft 323. The rotating body 324 includes a fixed rotating section 324A that is rotatable while vertically fixed and a liftable rotating section 324B that is raised or lowered integrally with the liftable shaft 323. Note that the lift mechanism of the liftable shaft 323, for example, is the same as that of the inspection wheel 12. For example, the height of the liftable shaft 323 is adjusted according to the height of the container V being handled. The fixed rotating section 324A and the liftable rotating section 324B may be engaged through a spline mechanism so that only the rotating motion is integrated.

The vertical gripper 321 includes a support plate 325, which supports the base of a container V, and a cap restraint member (an upper gripper finger) 326, which is pushed against the top face of the cap Vc. Dissimilar to the vertical grippers 206 of the switching wheel 20, the support plate 325 of the vertical gripper 321 is also movable in the vertical direction in addition to the cap restraint member 326. This configuration is for preventing interference between the support plate of the downstream outlet wheel 24B and the support plate 325 of the hold-change wheel 32. Incidentally, the support plate 325 does not have to be configured to move vertically if only a portion, which can be less than half, of the base of the container V is supported by either the support plate 325 and/or the support plate of the outlet wheel 24B, whereby, the support plate 325 and the support plate of the outlet wheel 24B do not interfere with each other when the support plate 325 and the support plate of the outlet wheel 24 come close enough to transfer the container V between each other. This is also true if the shape of the support plate 325 and the support plate of the outlet wheel 24 are configured as comb-toothed shapes that do not interfere with each other.

Similar to the cap restraint members 124B and 206B, a parallel linking mechanism 325A is used to move the support plate 325 vertically. Namely, the support plate 325 is biased upward by a biasing member 325B such as a spring and the like, and a cam follower 325C of the parallel linking mechanism 325A is urged against a cam 323A provided on the liftable shaft 323, and thereby, the support plate 325 is lifted up or lowered down in accordance with the height of the cam 323A. The support plate 325 that is lifted and supports the base of the container V can be seen at the container transfer position P5 in FIG. 9. On the other hand, the support plate 325 that is lowered and separated from the base of the container V can be seen at the container transfer position P6 in FIG. 9. Note that, at this moment, the base of the container V is supported by the support plate of the outlet wheel 24B arranged downstream.

The cap restraint member 326 is supported by a liftable rotating section 324B via a cap restraint member lift mechanism 326A so that the cap restraint member 326 is raised and lowered by the cap restraint member lift mechanism 326A. The cap restraint member lift mechanism 326A includes a lifting rod 326B to which the cap restraint member 326 is attached at the lower end. The lifting rod 326B is liftably supported by the liftable rotating section 324B and is biased downward by a biasing member 326C, such as a spring and the like. A cam follower 326D is provided at the upper end of the lifting rod 326B. The cam follower 326D engages with a cam 323A that is provided along the outer circumference of the liftable shaft 323, and the cap restraint member 326 is raised or lowered according to the height of the cam 323A. At the container transfer position P5 in FIG. 9, the pressed down cap restraint member 326 and the top face of the cap Vc can be seen restrained by the cap restraint member 326, and at the container transfer position P6 in FIG. 9, the cap restraint member 326 that is raised and thus separated from the cap Vc can be seen.

The neck gripper 322 is supported by a liftable rotating section 324B via a gripper operating mechanism 327, which performs operation including an opening/closing operation and an advance/retreat operation of the gripper. The neck gripper 322, which is movable along the radial direction of the rotating body 324 between a gripping position where the vertical gripper 321 holds the container V and a release position where it does not interfere with the container V, is opened and closed via the gripper operating mechanism 327. Namely, at the container transfer position P5, in which the container V is received from the first pitch converting wheel 22B, the neck gripper 322 is opened and is retracted to the release position, which is located radially inside to avoid interfering with the container V that is held by the vertical gripper 321. The neck gripper 322 is then pushed radially outward to the gripping position and is closed in order to transition from the vertical gripper 321 to the neck gripper 322 gripping the container V. Thereby, the neck gripper 322 grips the neck Vn just below the flange Vf of the container V, which is restrained between the support plate 325 and the cap restraint member 326, and the container V is conveyed along the circumference with both the vertical gripper 321 and the neck gripper 322 gripping the container V.

Thereafter, the support plate 325 is lowered by the parallel linking mechanism 325A and the cap restraint member 326 is raised by the cap restraint member lifting mechanism 326A so that the vertical gripper 321 releases the container V before it reaches the container transfer position P6 where it is transferred to the downstream outlet wheel 24B, all the while remaining in the grip of the neck gripper 322. At the container transfer position P6, the support plate 240A of the vertical gripper 240 of the outlet wheel 24B slides under the base of the container V, which is held by the neck gripper 322, to support the base of the container V, and the cap restraint member 242 of the vertical gripper 240 of the outlet wheel 24B is lowered and pressed onto the cap Vc of the container V. Thereby, the container V is gripped by the vertical gripper 240 of the outlet wheel 24B. At the same time, the neck gripper 322 is opened and retracted to the release position via the gripper operating mechanism 327 so that the container V is released.

As illustrated in FIG. 10A, the neck gripper 322 has a pair of gripper fingers 328 and 329. In FIG. 10A, the open state of the neck gripper 322 is illustrated by a solid line and the closed state is illustrated by a dashed line. Furthermore, on side P5 of the container transfer position of FIG. 9 the configuration of the gripper operating mechanism 327 coupled with the gripper finger 328 is illustrated, while on side P6 of the container transfer position of FIG. 9 the configuration of the gripper operating mechanism 327 coupled with the gripper finger 329 is illustrated.

In the gripper operating mechanism 327, a parallel linking mechanism is applied to each of the gripper fingers 328 and 329. The gripper finger 328 is supported by a pair of linking plates 328E and 328F of which one end of each plate is integrally attached to the rotating shafts 328C and 328D via a pair of shafts 328A and 328B. On the other hand, the gripper finger 329 is supported by a pair of linking plates 329E and 329F of which one end of each plate is integrally attached to the rotating shafts 329C and 329D via a pair of shafts 329A and 329B. The linking plates 328E and 328F are pivoted about the rotating shafts 328C and 328D while maintaining the parallel postulates, and the linking plates 329E and 329F are pivoted about the rotating shafts 329C and 329D while also maintaining the parallel postulates.

The rotations of the rotating shafts 328D and 329D are connected by the engagement of gears 328G and 329G so that each of the rotating shafts 328D and 329D rotates through the same angles but in opposite directions. Therefore, the gripper fingers 328 and 329 are symmetrically translated in line by the rotation about the rotating shafts 328C and 328D and about the rotation shafts 329C and 329D, respectively. Thereby, the gripper fingers 328 and 329 approach each other to close while translating radially outward (the left side of FIGS. 10A and 10B), and move apart from each other to open while translating radially inward (the right side of FIGS. 10A and 10B).

As illustrated in FIG. 10B, the pair of parallel linking mechanisms of the gripper operating mechanism 327 is operated by a swing lever 327B in which one end is provided with a cam follower 327A. The swing lever 327B is pivoted about a rotating shaft 329D at around the center section of the lever 327B and the other end of the lever is rotatably engaged with a shaft 328A as a working point of the linking mechanism. On the end of the swing lever 327B where the cam follower 327A is provided, one end of a biasing member 327C, such as a spring and the like, is attached where the other end of the biasing member 327C is attached to the liftable rotating section 324B, and thereby the neck gripper 322 is pushed radially outside and the swing lever 327B is rotatably biased about the rotating shaft 329D in the direction for closing the gripper.

Namely, in FIG. 10A, the shaft 328A (i.e., the linking plate 328E) is rotated in the counterclockwise direction about the rotating shaft 328C by the swing lever 327B, and in connection with this motion the rotating shaft 328D is rotated together with the linking plate 328F in the same direction. Furthermore, the rotating shaft 329D together with the linking plate 329F rotates in the opposite direction (the clockwise direction) by the engagement of the gears 328G and 329G. Thereby, the linking plate 329E is also rotated in the clockwise direction in connection with the rotation of the shaft 329D. Namely, the neck gripper 322 is pushed radially outward and the gripper is closed.

Note that the cam follower 327A is pushed against a cam 323B provided along the circumference of the liftable shaft 323. When the liftable rotating section 324B rotates, the cam follower 327A travels along the cam 323B so that the gripper operating mechanism 327 is actuated so that the opening/closing operation and the advance/retreat operation of the neck gripper 322 is controlled. Furthermore, in the present embodiment, the containers V gripped by the neck grippers 220 of the first pitch converting wheel 22B of an upstream neck gripping wheel are received by the vertical grippers 321 of the hold change wheel 32 and the way of holding the container V is changed from the vertical grippers 321 to the neck grippers 322 while rotating the containers V along the circumference of the wheel. However, the vertically gripping wheel may also be arranged upstream of the hold change wheel and the neck gripping wheel may also be arranged downstream of the hold change wheel. In such case, the containers V gripped by the vertical grippers of the vertically gripping wheel are received by the neck grippers 322 of the hold change wheel 32 and the way of holding the containers V is changed from the neck grippers 322 to the vertical grippers 321 while conveying the containers V along the circumference of the wheel.

The containers V, which have passed through the first pitch converting wheel 22A and the hold change wheel 32, are transferred to the carrier link conveyors 26A and 26B via the outlet wheels 24A and 24B, respectively. The outlet wheels 24A and 24B are the vertically gripping wheels, which rotate in opposite directions, and which use the vertical grippers 240 (see FIG. 9), which have the same configuration as the vertical grippers 125 of the inspection wheel 12 illustrated in FIGS. 2 and 3, to convey the containers V along the outer circumference of the outlet wheels 24A and 24B. The outlet wheels 24A and 24B transfer the containers V at the reference interval or pitch Pt to the respective carrier link conveyors (a first endless conveyor) 26A and 26B, which are provided with a plurality of neck grippers.

Figure 11:
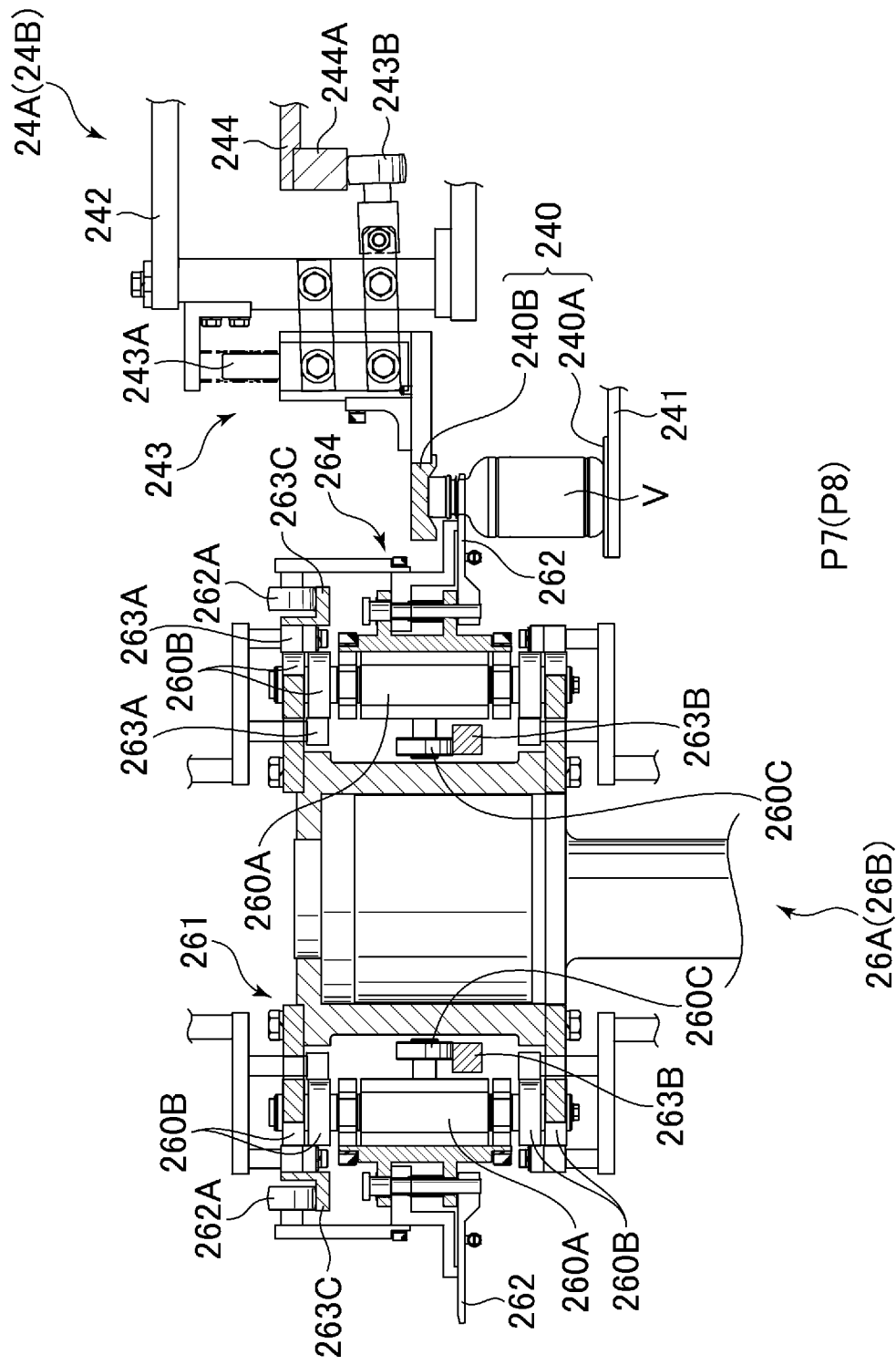
FIG. 11 is an enlarged partial side sectional view at the container transfer position P7 (P8) where the container V is transferred from the outlet wheel to the carrier link conveyor.

Namely, as illustrated in FIG. 11 of a partially enlarged sectional view around a container transfer position P7 (P8) where the container V from the outlet wheel 24A (24B) is transferred to the carrier link conveyor 26A (26B), the vertical gripper 240 includes a support plate 240A that is provided on the outer circumference of a fixed rotating section 241, which is vertically fixed, and a cap restraint member 240B that is supported on the outer circumference of a liftable rotating section 242, which is vertically movable. The cap restraint member 240B is lifted via a parallel linking mechanism 243.

The parallel linking mechanism 243 urges the cap restraint member 240B downward by a biasing member 243A, such as a spring and the like, that is attached to the liftable rotating section 242. A cam follower 243B is provided on the tip of a control lever of the parallel linking mechanism 243 and is urged against a cam 244A provided along the outer circumference of a fixed shaft 244. When the liftable rotating section 242 rotates, the cam follower 243B travels along the cam 244A and in turn the cap restraint member 240B is lifted or lowered in accordance with the profile of the cam 244A. Thereby, the restraint and release of the container V by the vertical gripper 240 is controlled.

The neck grippers 262 of the carrier link conveyors 26A and 26B do not have an opening/closing mechanism and instead are constantly biased in the closing direction by a biasing member, such as a spring and the like. In order to transfer the container V from the outlet wheels 24A and 24B to the carrier link conveyors 26A and 26B, the neck Vn of the container V held by the vertical gripper 240 is pushed into the neck gripper 262, which is closed by the biasing force, and at the same time the vertical gripper 240 releases the container V. Incidentally, the neck grippers 262 of the carrier link conveyor may also be configured similar to the opening/closing mechanism applied to the neck grippers 220 of the first pitch converting wheels 22A and 22B, which may include the cam and cam follower.

On the other hand, the carrier link conveyor 26A (26B) is a neck-handling conveyor system including an endless roller chain 260 entrained around a pair of sprockets 261 that rotate about vertical axes that are arranged at a horizontal distance. The neck grippers 262 are provided on blocks 260A configuring the chain 260 and protrude outward. Each block 260A is rotatably supported by the neighboring blocks 260A on both sides via each axis of the rollers 260B. The endless roller chain 260 is driven via the engagement between the rollers 260B and the sprockets 261.

Rails 263A for restricting the movement of the blocks 260A in the lateral direction are provided on the linear portions of the carrier link conveyor 26A (26B). Further, guides 263B extending along the conveyance route (in the longitudinal direction) are provided on the back side of the blocks 260A. Furthermore, side guide rollers 260C, which run on the guides 263B, are respectively provided on the back side (the side opposite to the neck gripper 262) of each block 260A. Moreover, a lift mechanism 264 for slightly lifting and lowering the neck gripper 262 in the vertical direction with respect to the block 260A is provided on each of the grippers 262 (detailed later). Normally, as shown in FIG. 11, the lift mechanism 264 prevents the neck gripper 262 from being lowered, which may occur when the container V is handed over and be caused by the roller 262A that runs on the rail 263C extending along the chain route.

Figure 12:
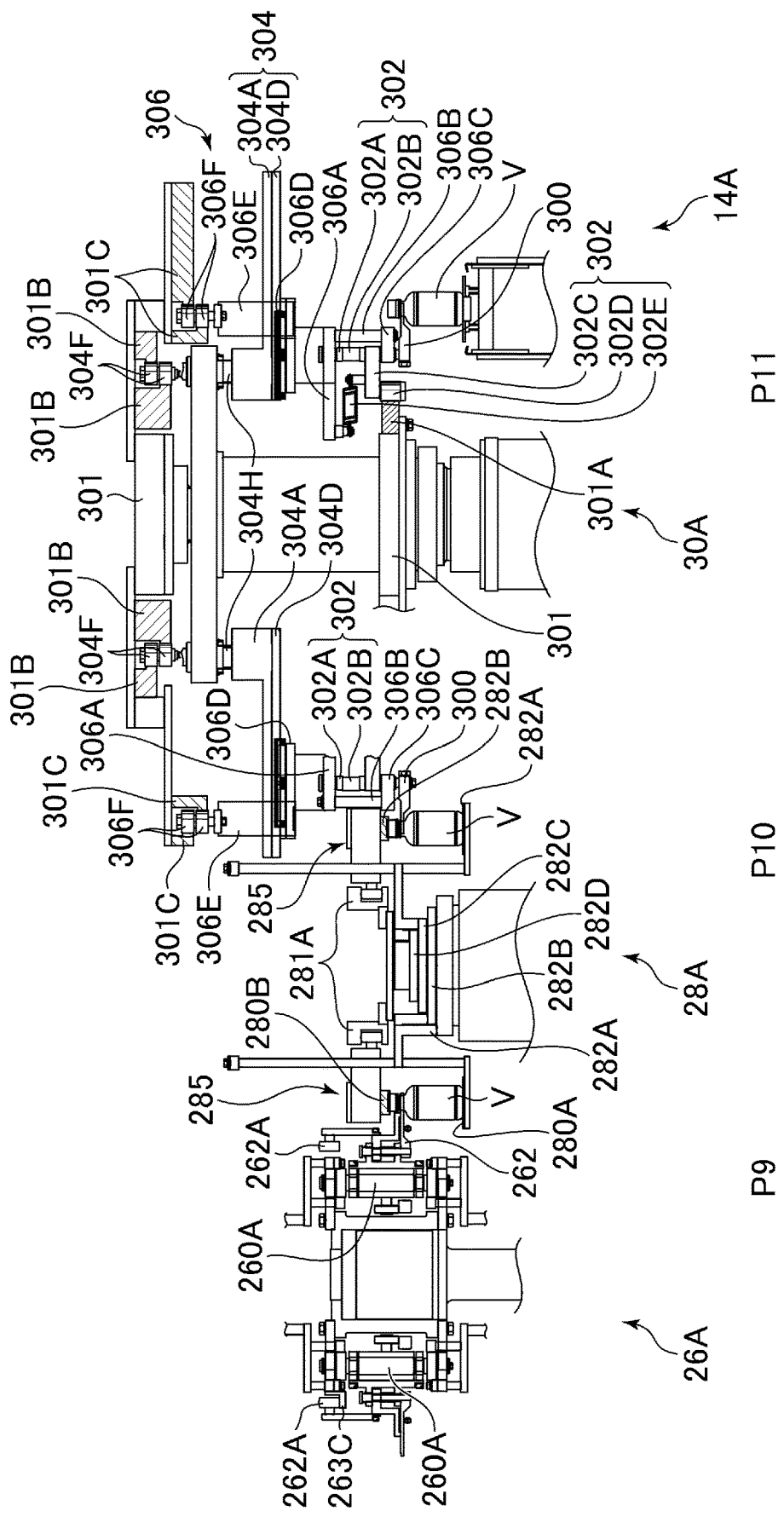
FIG. 12 is a side sectional view illustrating the configuration at the container transfer positions P9, P10 and P11 from the carrier link conveyor via the servo wheel and the second pitch converting wheel to the outlet conveyor.
Figure 13:
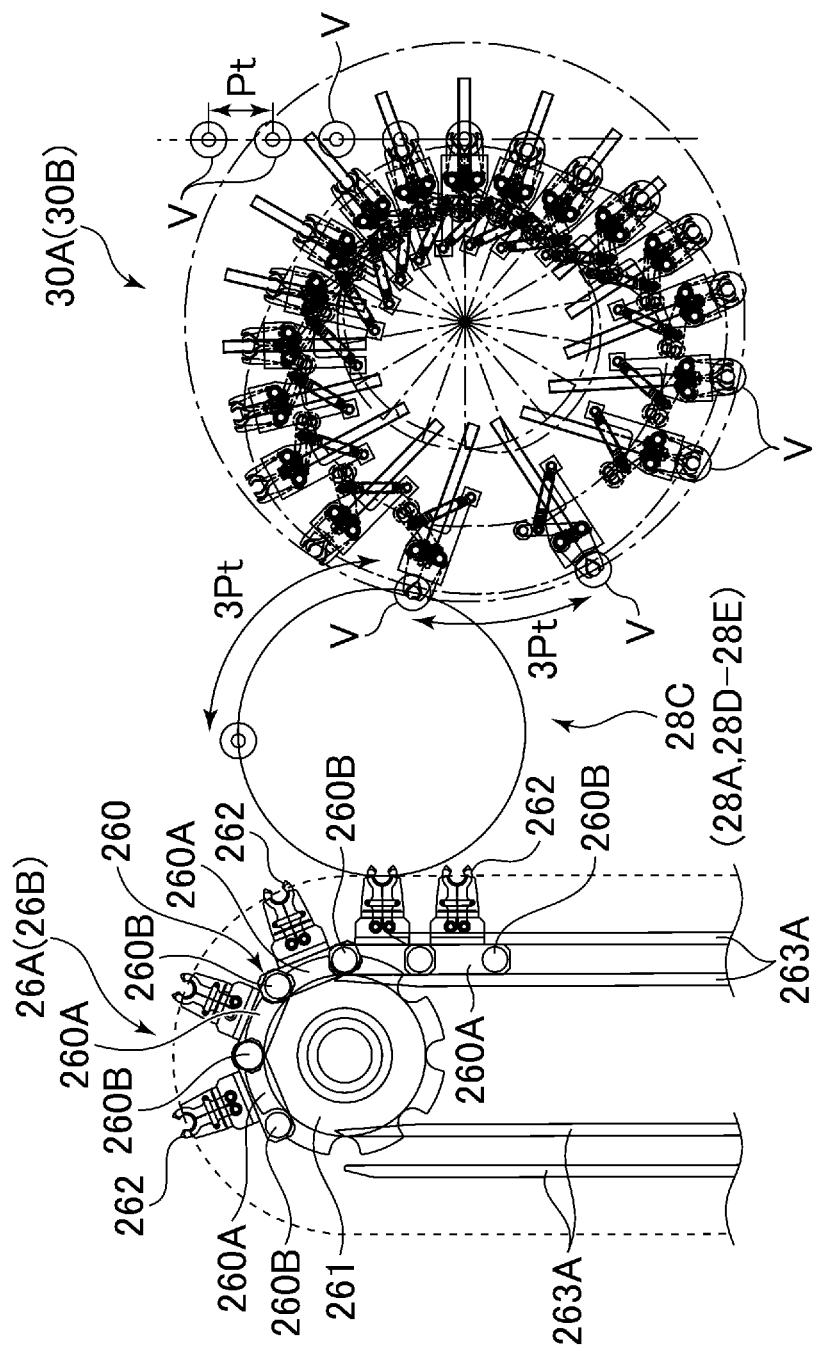
FIG. 13 is a plan view that corresponds to FIG. 12.
Figure 14:
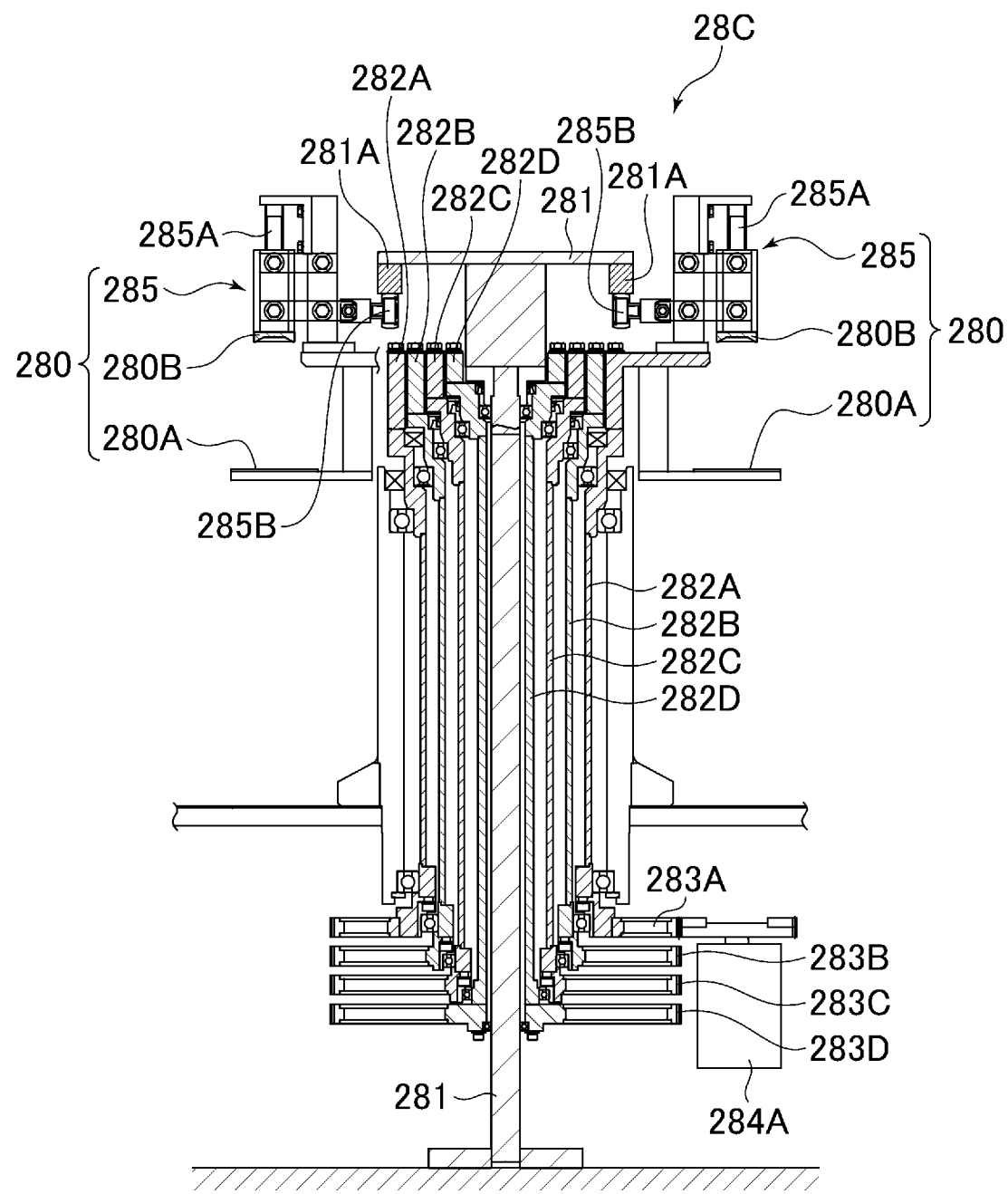
FIG. 14 is a side sectional view of the servo wheel.

FIG. 12 is a vertical sectional view illustrating the configuration around the container transfer positions P9, P10 and P11, where the container V is transferred from the carrier link conveyor 26A (26B) through the servo wheels 28A-28C (28D-28F) to the second pitch converting wheels 30A (30B). FIG. 13, is a plan view schematically illustrating the servo wheel 28C located at the farthest downstream position, as an example in the first route "I", which corresponds to the sectional view of FIG. 12. Further, FIG. 14 is a vertical sectional view of the servo wheels 28A-28F. In the present embodiment, the first route "I" includes three servo wheels 28D-28F and three second pitch converting wheels 30A, and the second route "II" includes three servo wheels 28D-28F and three second pitch converting wheels 30B. However, the configurations of each pair of a servo wheel and a second pitch converting wheel is basically the same, therefore the servo wheel 28C and the second pitch converting wheel 30A configuring the farthest downstream line in the first route "I" will be explained as an example.

The servo wheel 28C is a vertically gripping wheel that includes vertical grippers 280. The vertical grippers 280 can be individually rotated so that the servo wheel 28C can securely receive the container V from the carrier link conveyor 26A even though there may be gripper not holding any container due to the container rejection performed by the inspection wheel 12 (detailed later).

The servo wheel 28C in FIG. 14, for example, includes four vertical grippers 280. The servo wheel 28C has four drive shafts 282A, 282B, 282C and 282D around a fixed shaft 281 from the outside to inside. On the bottom end of each of the drive shafts 282A, 282B, 282C and 282D, gears 283A, 283B, 283C and 283D, for example, are provided, respectively. Each of the drive shafts 282A, 282B, 282C and 282D is rotated by individual-servo motors 284A-284D. Although, only the servo motor 284A engaged with the gear 283A of the outermost drive shaft 282A is illustrated in FIG. 14, each of the servo motors 284B-284D are connected to the gears 283B-283D provided at the bottom end of each drive shaft 282B, 282C and 282D, so that the drive shafts 282B, 282C and 282D are individually rotatable in the same way.

In FIG. 14, the right-side vertical gripper 280 is provided on the tip end of an arm extending radially outward from the outermost drive shaft 282A. A support plate 280A of the vertical gripper 280 is supported by the arm of the drive shaft 282A. Above the support plate 280A, a cap restraint member 280B is disposed and is supported by the arm of the drive shaft 282A via a parallel linking mechanism 285. The parallel linking mechanism 285 biases the cap restraint member 280B downward by a biasing member 285A, such as a spring and the like. A cam follower 285B is provided on a control lever of the parallel linking mechanism 285 so that the cam follower 285B is pressed onto a cam 281A provided along the outer circumference of the fixed shaft 281 by the biasing force of the biasing member 285A. The cam 281A lowers the cam follower 285B down at the container transfer position P9, which is located at the contact point with the carrier link conveyor 26A, and at the container transfer position P10, which is located at the contact point with the second pitch converting wheel 30A so that the vertical gripper 280 is opened at the container transfer positions P9 and P10.

Figure 15:
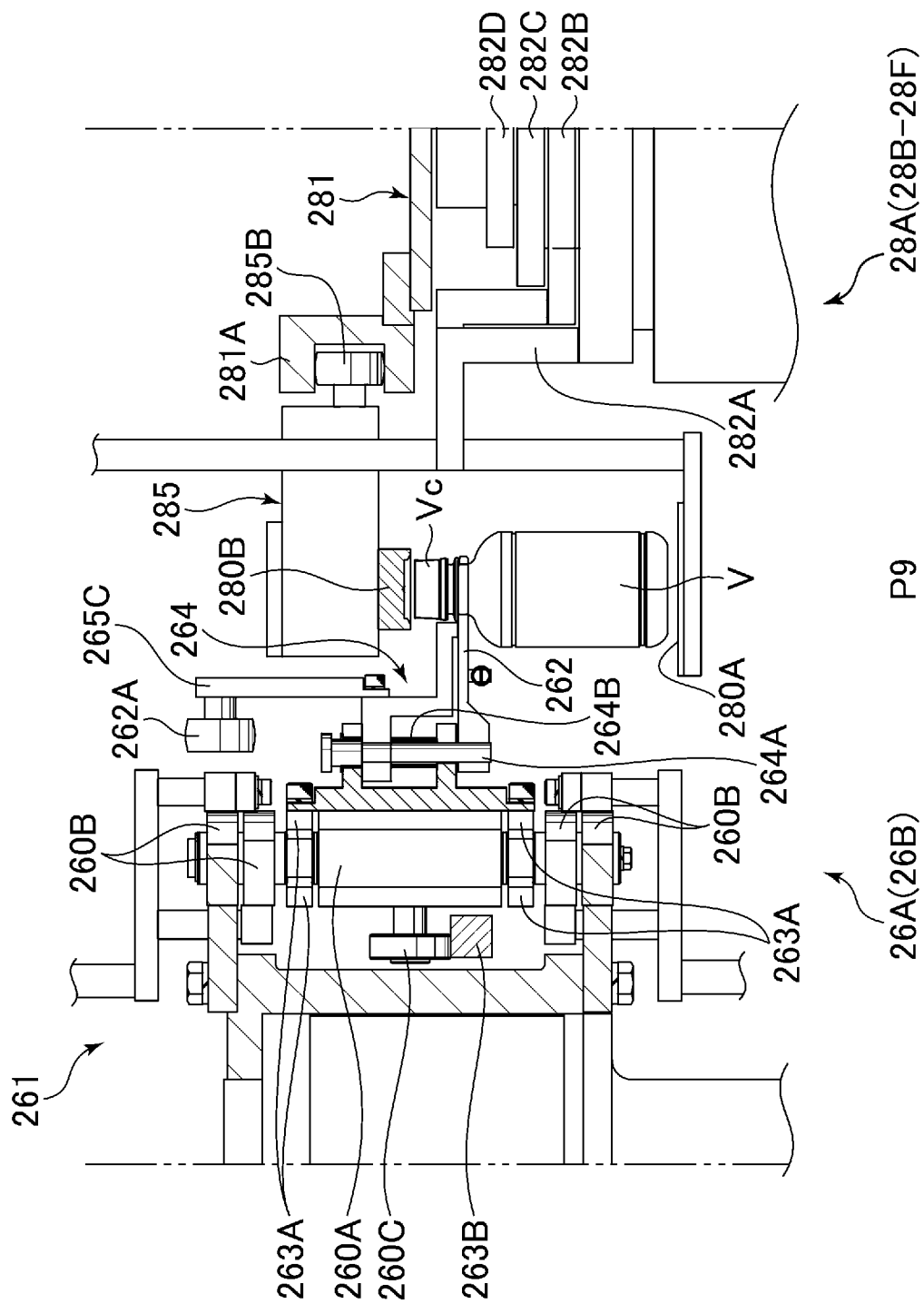
FIG. 15 is an enlarged partial side sectional view of the carrier link conveyor and the servo wheel around the container transfer position P9 just before the vertical gripper of the servo wheel grips the container.
Figure 16:
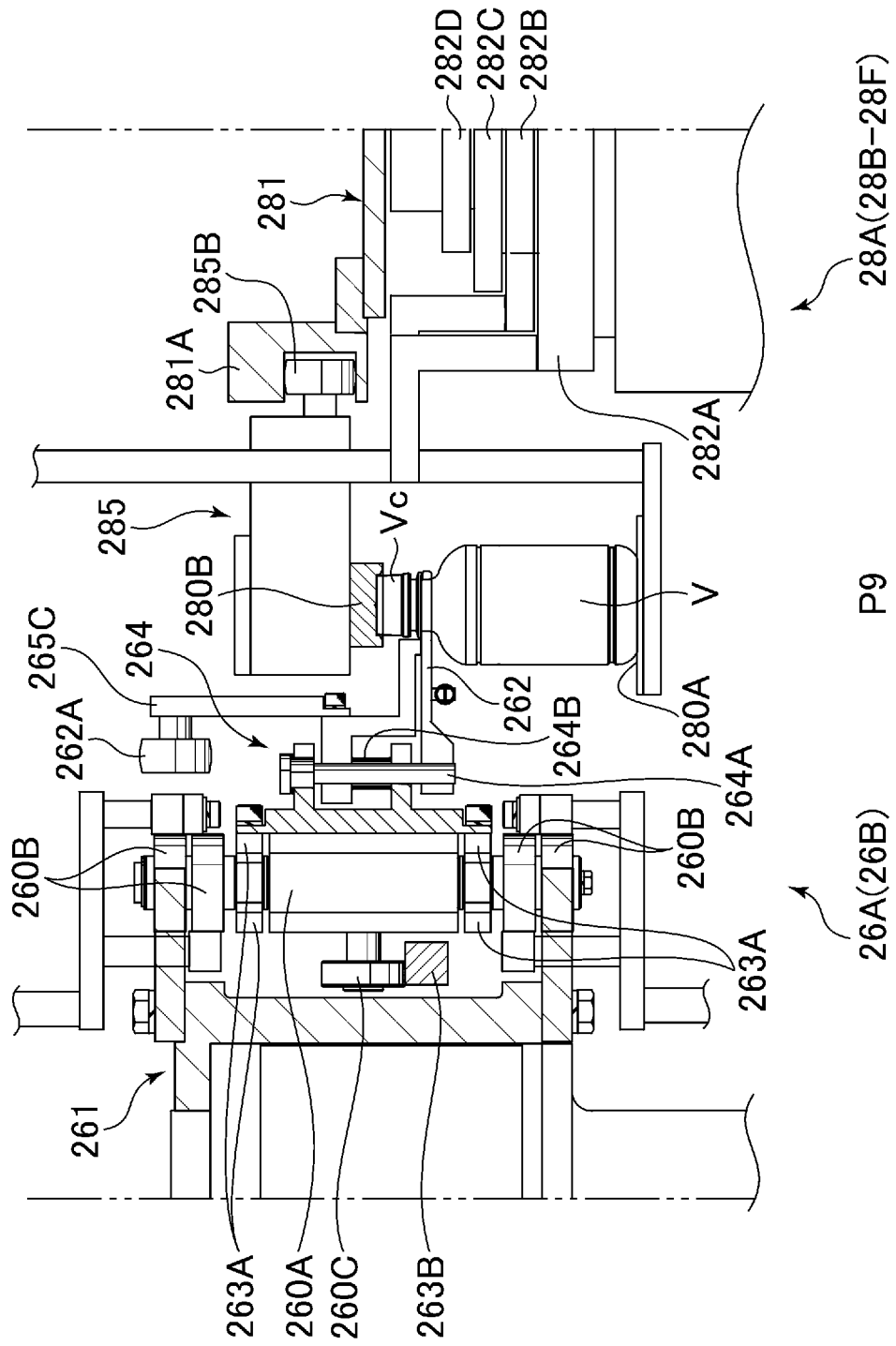
FIG. 16 is an enlarged partial side sectional view of the carrier link conveyor and the servo wheel around the container transfer position P9 when the vertical gripper of the servo wheel grips the container.

FIG. 15 and FIG. 16 are enlarged sectional views of the neck gripper 262 and the vertical gripper 280 at the container transfer position P9. FIG. 15 illustrates just before the vertical gripper 280 grips the container V. FIG. 16 illustrates when the container V is gripped by the vertical gripper 280. With reference to FIG. 15 and FIG. 16, the configurations and the functions of the lift mechanism 264 of the present embodiment will be explained.

In a container transfer section where the containers V carried by the carrier link conveyor 26A (26B) are transferred to the servo wheels 28A-28C (28D-28F), the rail 263C, which supports the roller 262A, is not provided. Thereby, the neck gripper 262 is slightly movable in the vertical direction via the lift mechanism 264. Namely, the neck gripper 262 is mounted on a vertical shaft 264A that is attached slidably in the vertical direction to the block 260A, and biased upward by a biasing member 264B, such as a spring and the like. Further, a support member 265C that extends in the vertical direction is connected to the neck gripper 262 and the roller 262A is provided on the tip end of the support member 265C. In the interval where the rail 263C is provided, the roller 262A engages with the rail 263C so that the movement of the neck gripper 262 in the vertical direction is restricted. On the other hand, in the interval where the rail 263C does not exist, the neck gripper 262 is lowered together with the vertical shaft 264A when a downward force greater than the biasing force of the biasing member 264B is applied on the neck gripper 262.

In FIG. 15, the cap restraint member 280B is lifted upward and the neck gripper 262 is also in a relatively high position by the biasing force of the biasing member 264B.

Thereby, the base of the container V gripped by the neck gripper 262 is located at a position slightly higher than the support plate 280A. In FIG. 16, the cap restraint member 280B is lowered by the engagement of the cam 281A and the cam follower 285B, and the cap restraint member 280B is pressed onto the top face of the cap Vc. Thereby, a downward force is applied to the neck gripper 262 and the container V is lowered until the base abuts against the support plate 280A. Accordingly, the container V is gripped by the vertical gripper 280 of the servo wheel 28A (28B-28F).

If the lift mechanism 264 is not provided, the container V is transferred with a gap between the bottom of the container V and the support plate 280A, so that the posture of the container V becomes unstable when the container V is pulled out from the gripper 262. However, by providing the lift mechanism 264 as the present embodiment, the vertical gripper 280 of the servo wheel 28A (28B-28F) can securely grip the container V already gripped by the neck gripper 262. Thereby, the vertical gripper 280 can stably and securely pull the container V out from the neck gripper 262 by restraining the container V by the vertical gripper 280 even when the neck gripper 262 is not provided with the gripper opening/closing mechanism. Incidentally, the lift mechanism 264 can also be applied to a neck gripper provided with the gripper opening/closing mechanism such including the cam and the cam follower. Further, the neck gripper provided with the lift mechanism 264 can also be provided on the periphery of the rotating body, such as the inlet wheel 18, instead of the carrier link conveyor 26A (26B).

Figure 17:
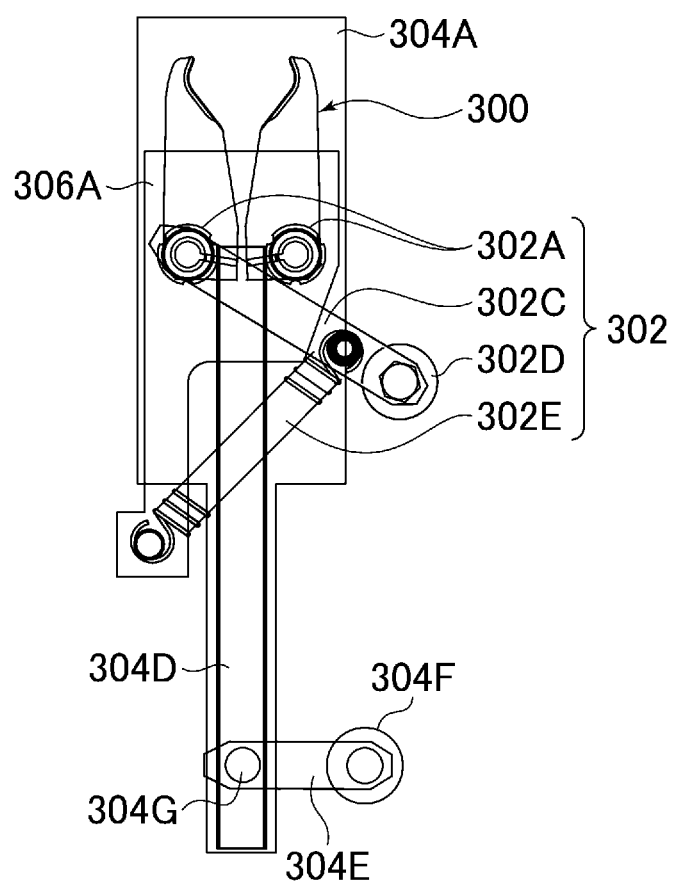
FIG. 17 is an enlarged plan view of the carrier link conveyor including a gripper swing mechanism and a gripper advance/retreat mechanism.

Next, with reference to FIG. 12, FIG. 13 and FIG. 17, the configuration of the second pitch converting wheel 30A (30B), which is a neck-gripping wheel, will be explained. Note that, FIG. 17 is an enlarged plan view of a neck gripper 300 of the second pitch converting wheel 30A (30B) that includes a gripper swing mechanism and a gripper advance/retreat mechanism.

In the present embodiment, a plurality of servo wheels 28A (28B-28F) is provided for one carrier link conveyor 26A (26B). When three servo wheels 28A-28C (28D-28F) are provided for each carrier link conveyor 26A (26B), each of the servo wheels 28A (28B-28F) generally receives every third container V from the carrier link conveyor 26A (26B). Therefore, the interval between the containers V becomes three times the reference interval Pt.

The second pitch converting wheel 30A (30B) transfers the container V to the outlet conveyor 14 after restoring this interval (3*Pt) to the original reference interval Pt. Therefore, the second pitch converting wheel 30A (30B) includes a gripper swing mechanism 304 and a gripper advance/retreat mechanism 306 in addition to the gripper opening/closing mechanism 302 of the neck gripper 300. The gripper swing mechanism 304 changes the direction of the neck gripper 300 to vary the interval (pitch) between the neck grippers 300 and the gripper advance/retreat mechanism 306 moves the neck gripper 300 in the radial direction.

The gripper opening/closing mechanism. 302 is mounted on an advance/retreat plate. 306A of the gripper advance/retreat mechanism 306, which is attached to a swing plate 304A of the gripper swing mechanism 304. One end of a pair of rotating axes 302A used to open and close the fingers of the neck gripper 300 are each rotatably supported by the advance/retreat plate 306A. The other end to which the gripper fingers are attached is rotatably supported by a rotating support member 306C fixed to the advance/retreat plate 306 via a connecting member 306B. The rotating axes 302A are engaged with one another by a pair of gears 302B to rotate in the opposite direction so that the neck gripper 300 is opened and closed.

A lever 302C for rotating the rotating axes 302A is attached to one of the rotating axes 302A and a gripper opening/closing cam follower 302D is provided on the tip end of the lever 302C. One end of a biasing member 302E, such as a spring and the like, is fixed to the advance/retreat plate 306A and the other end is connected to the lever 302C to bias the neck gripper 300 in the closing direction. This biasing force pushes the gripper opening/closing cam follower 302D against an opening/closing cam 301A on the fixed shaft 301 of the wheel. Note that, in FIG. 12, some of the components around the container transfer position P10 are omitted.

The advance/retreat plate 306A of the neck gripper advance/retreat mechanism 306 is supported by the swing plate 304A via a slider 306D that is slidable along a rail 304D provided on the swing plate 304A. A swing lever 304E is attached to the swing plate 304A via a connecting member 304H. On the tip end of the swing lever 304E, a swing cam follower 304F is provided that moves along a swing cam 301B of the fixed shaft 301 when the second pitch converting wheel 30A (30B) is rotated. Namely, the swing plate 302A or the neck gripper 300 is swung around a swing axis 304G as the second pitch converting wheel 30A (30B) is rotated.

Furthermore, an advance/retreat cam follower 306F is provided on the slider 306D, which supports the advance/retreat plate 306A via a connecting member 306E. The advance/retreat cam follower 306F is engaged with an advance/retreat cam 301C of the fixed shaft 301 so that the slider 306D is moved back and forth along the rail 304D as the second pitch converting wheel 30A (30B) rotates, and thereby, the neck gripper 300 moves along the rail 304D.

The illustration in FIG. 13 depicts how the neck gripper 300, which is opened and closed by the gripper opening/closing mechanism 302, is advanced and retreated along the rail 304D while it is rotated about the swing axis 304G by the gripper swing mechanism 304 and the gripper advance/retreat mechanism 306, and thereby how the interval between the containers V is converted from 3*Pt to the reference interval Pt.

Furthermore, as illustrated in FIG. 12, when the interval (pitch) between the conveying containers V is varied to the reference interval Pt in the second pitch converting wheel 30A (30B), the container V reaches the conveyance surface of the corresponding conveyor lane of the outlet conveyor 14, for example the conveyor lane 14A. The neck gripper 300 is then opened by the gripper opening/closing mechanism 302 to release the container V held by the gripper 300, and in turn, the container V is transferred to the outlet conveyor 14. The released container V is placed on the conveyance surface of each conveyor lane of the outlet conveyor 14 and passed to downstream. Incidentally, the interval (pitch) conversion from 3*Pt to Pt may also be carried out by adding additional wheels to the second pitch converting wheels 30A and 30B, for example, the interval (pitch) may be converted from 3*Pt to 2*Pt in the servo wheels 28A-28F while the second pitch converting wheels 30A and 30B convert the interval from 2*Pt to Pt.

Next, with reference to FIG. 18, the normal mode switching operation and the switching adjusting mode operation of the switching wheel 20 is explained.

FIG. 18 shows the case when seven cap restraint members 206B are provided along the outer circumference of the fixed rotating section 202 of the switching wheel 20. In the table of FIG. 18, the normal mode switching operation for three laps is listed and the seven cap restraint members 206B are numbered from $1^{st}$ to $7^{th}$ in order. In the table, the head number of the cap restraint members 206B, the route numbers in which the containers held by each of the heads are delivered, and the status of the cams 201A, 201B and 201C (referred to as cams A, B and C in the table) at each of the container transfer positions P1, P2 and P3 are indicated. Note that, the status of the cams A, B and C indicates whether each liftable cam "A", "B" and "C" is in the "UP" position or in the "DOWN" position.

In the present embodiment, the number of heads is odd. Therefore, when the containers V are alternately delivered to the first route "I" and the second route "II", the head numbers assigned to each route are alternated in the first lap and the second lap. For example, when the containers V held by the first, third, fifth and seventh head grippers are delivered to the first route "I" and the containers V held by the second, fourth and sixth head grippers are delivered to the second route "II", the container V held by the last seventh head gripper is delivered to the first route "I". Thereby, in the second lap, the containers V held by the first, third, fifth and seventh head grippers are delivered to the second route "II" and the containers V held by the second, fourth and sixth head grippers are delivered to the first route "I". Furthermore, in the third lap, the containers V held by the first, third, fifth and seventh head grippers are again delivered to the first route "I" and the containers V held by the second, fourth and sixth head grippers are again delivered to the second route "II". Namely, the head numbers assigned to the first and second routes "I" and "II" are alternated in every lap.

On the other hand, in the present embodiment, the controller 16 detects which neck gripper 185 of the inlet wheel 18 does not hold the container V on the basis of a rejection signal from the inspection wheel 12 and, for example, a signal from an encoder of the inlet wheel 18 (a grip state detecting means). Furthermore, the controller 16 monitors the quantity of the containers V conveyed by each of the conveyor lanes 14A-14F of the outlet conveyor 14 in accordance with a signal from the sensor 17. Moreover, the controller 16 compares the quantity of the containers V evacuated through the outlet wheel 22A of the first route "I" and the outlet wheel 22B of the second route "II" (a quantity comparing means), and determines which number of containers V transferred from either of the outlet wheel 22A and the outlet wheel 22B is greater. Note that, the quantity of the containers V may also be detected by counting the number of containers V transferred from the first pitch converting wheels 22A and 22B.

The controller 16 controls the up/down position of the cams 201A, 201B and 201C of the switch wheel 20, the advance/retreat position of the movable cam 181B of the inlet wheel 18, and the advance/retreat position of the movable cam 224C of the first pitch converting wheels (the first and second outlet wheels) 22A and 22B so that the number of containers V delivered to the first route "I" and the second route "II" becomes substantially the same. Namely, the quantity of containers V delivered to each of the routes is adjusted by switching the route of the container V to be delivered, either from the first route "I" to the second route "II" or from the second route "II" to the first routed "I".

For example, when the containers V are sorted on the basis of the table in FIG. 18 and when the container V that is planned to be received by the third head gripper in the second lap is rejected from the line at the inspection wheel 12, the corresponding neck gripper 185 of the inlet wheel 18 will not hold the container V, and furthermore, when the controller 16 determines that the quantity of the containers V delivered to the second route "II" is less than that of the first route "I" at a predetermined number, then the container V held by the third head gripper intended to be delivered to the first route "I" in the first lap is not transferred to the first pitch converting wheel (the first outlet wheel) 22A and instead is transferred to the second route "II" in the second lap.

Namely, the cam "A" at the container transfer position P2 (the first evacuate position) for the third head gripper of the first lap is located at the "UP" position so that the vertical gripper 200 is maintained in the closed state (the gripped state). At the same time, the movable cam 224C of the first pitch converting wheel 22A is advanced radially outward to maintain the neck gripper 220 in the open state (released state) and whereby substantial interference between the neck gripper 220 and the container V gripped by the vertical gripper 220 is prevented. Furthermore, the cam "A" at the container transfer position P3 (the second evacuate position) is also located at the "UP" position so that the vertical gripper 200 is maintained in the state gripping the container V and passes through the container transfer position P3. Note that, there is no need to advance the movable cam 224C radially outward to open the neck gripper 220, because the phase between the vertical gripper 200 corresponding to the third head gripper and the neck gripper 220 of the first pitch converting wheel 22B does not coincide.

In the second lap, the cam "A" at the container transfer position P1 for the third head gripper is located at the "UP" position so that the vertical gripper 200 is maintained in the closed state (the gripped state). At the same time, the movable cam 181B is advanced radially outward to maintain the neck gripper 220 in the open state (released state) and to prevent the neck gripper 185 from interfering with the neck of the container V held by the third head gripper, and furthermore, the neck gripper 185 corresponding to the rejected container is opened (in the released state).

The third head gripper that has passed through the container transfer position P1 reaches the container transfer position P2 in the second lap while holding the container V. Since the cam "A" is maintained in the "UP" position at the container transfer position P2, the third head gripper further passes through the container transfer position P2 toward the container transfer position P3 (the second evacuate position) while maintaining the gripped state. At the container transfer position P3, the cam "A" is located in the "DOWN" position so that the vertical gripper 200 releases the container V and the container V is transferred to the neck gripper 220 of the second pitch converting wheel 22B. As described above, the container V, which is normally delivered to the first route "I", can be switched to the second route "II" so that an equal number of containers V are delivered to the first route "I" and the second route "II".

Note that, in the present embodiment, the controller 16 includes a sensor that detects the position of the vertical gripper 200 of the switching wheel 20 (a position detecting means). According to a signal from the sensor and the rejection signal, the controller 16 determines which head (vertical gripper 200) of the switching wheel 20 will be synchronized with the neck gripper 185, which corresponds to the rejected container V, at the container transfer position P1. Thereby, the controller 16 controls each of the cams 181B and 224C, and each of the cams 201A, 201B and 201C to operate as described above.

Next, with reference to FIG. 19 to FIG. 22, the transfer operation performed by the servo wheels 28A-28F is explained, in which the vertical gripper pulls the container V out from the neck gripper of the carrier link conveyors 26A and 26B, and hands it over to the second pitch converting wheels 30A and 30B. Note that, in the following descriptions, the operation is only explained for the devices in the second route "II", such as the carrier link conveyor 26B, the servo wheels 28D-28F and the second pitch converting wheel 30B. However, it is true for the operation for the devices in the first route "I" such as the carrier link conveyor 26A, the servo wheels 28A-28C and the second pitch converting wheel 30A.

Figure 19:
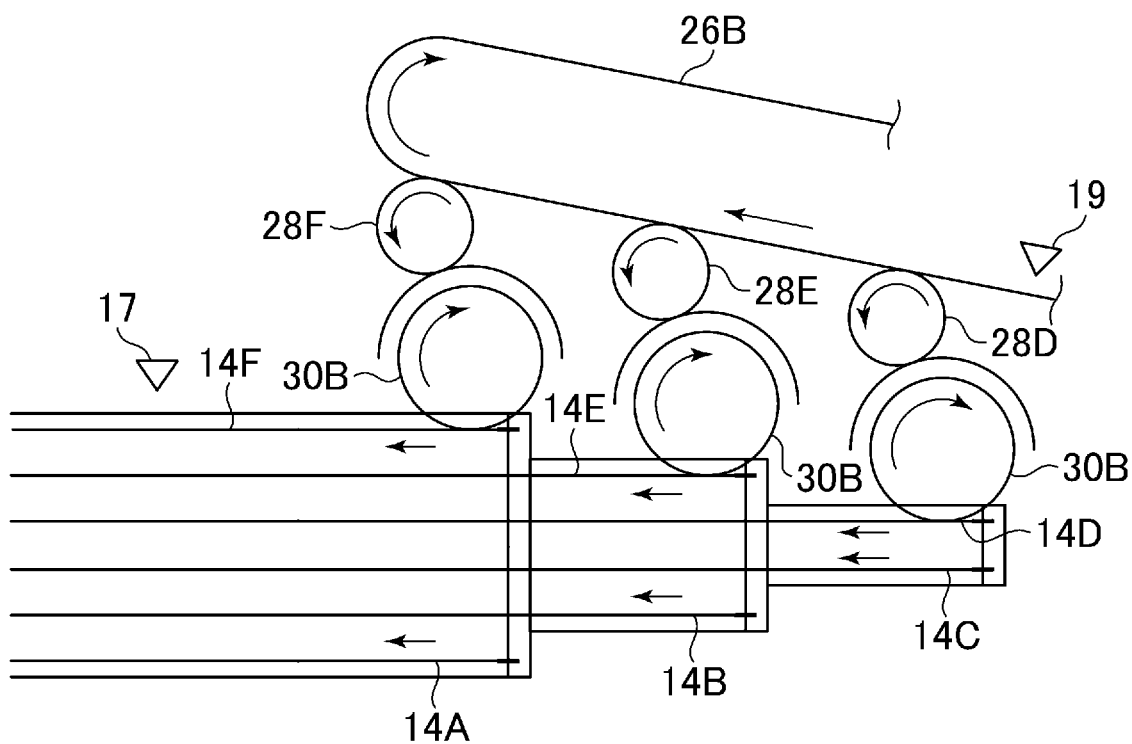
FIG. 19 is an enlarged plan view of the container conveyor system indicating a second route from the carrier link conveyor to the outlet conveyor.

FIG. 19 schematically illustrates a plan view of a part of the container conveyor system 10 with an enlarged section where the containers are transferred to the outlet conveyor 14 via the servo wheel 28D, 28E and 28F and the second pitch converting wheel 30B of the second route "II".

Figure 20:
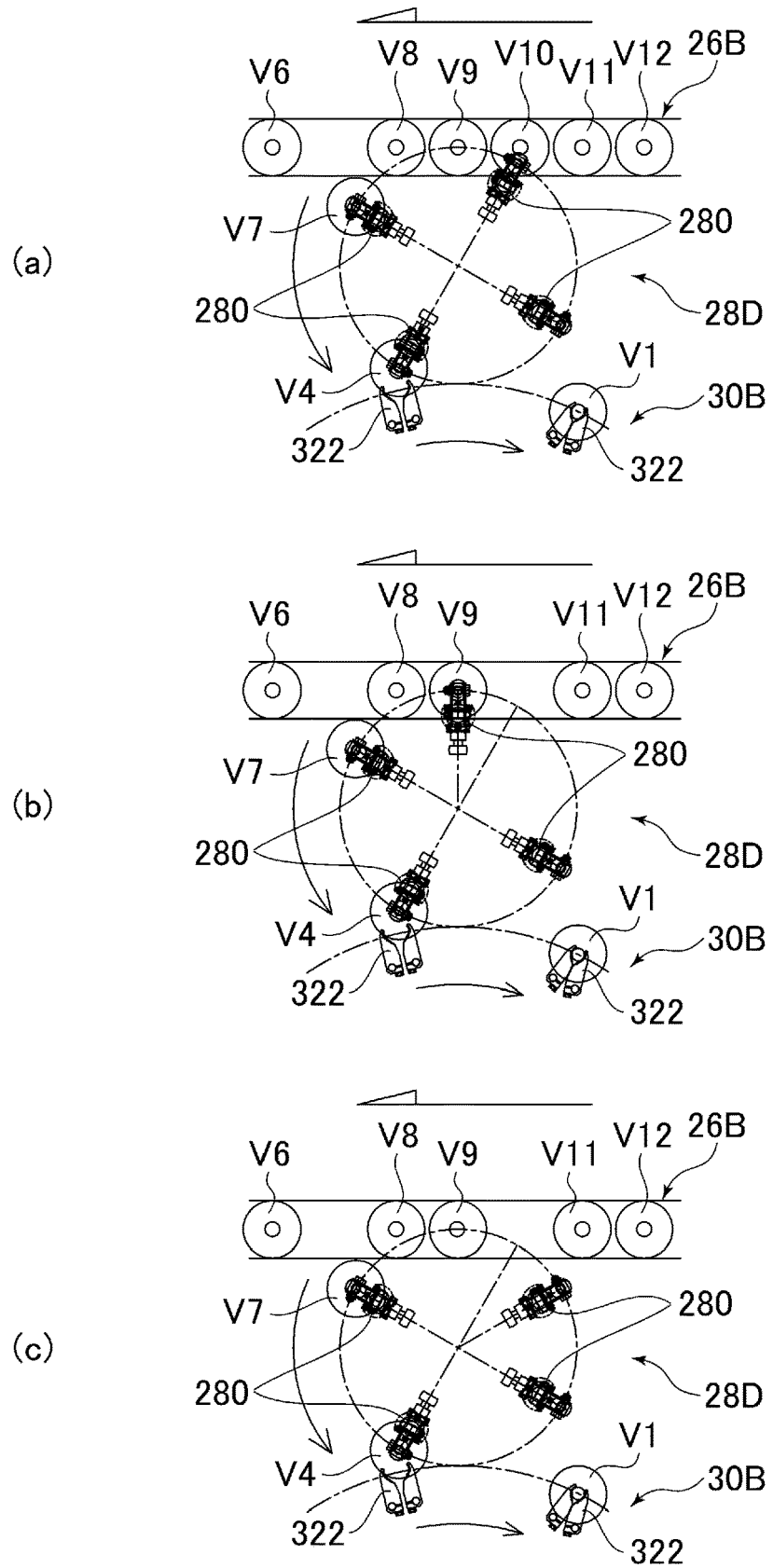
FIG. 20 is a plan view schematically illustrating an operation of the servo wheel positioned in its farthest upstream position, receiving the container from the carrier link conveyor.

At an upstream position of the container transfer section of the carrier link conveyor 26B, which is used for transferring the containers V from the carrier link conveyor 26B to the servo wheels 28D, 28E and 28F, a sensor 19 is provided. The presence of a container V, which is conveyed by a neck gripper 260 of the carrier link conveyor 26B, is detected by the sensor 19 at a predetermined position and a result is fed to the controller 16 (see FIG. 1). FIGS. 20, 21 and 22 are plan views that schematically illustrate when the containers V are received by each of the servo wheels 28D, 28E and 28F from the carrier link conveyor 26B. Incidentally, instead of signals from the sensor 19, the existence of the container V held by the neck grippers 260 can also be determined by the controller 16 that receives the rejection signal from the upstream inspection wheel 12 and refers to the signals from an encoder of each of the wheels.

FIG. 20(a), FIG. 21(a) and FIG. 22(a) illustrate moments when each of the servo wheels 28D, 28E and 28F receives the container V. Furthermore, FIG. 20(a), FIG. 21(a) and FIG. 22(a) illustrate when any container V has not been rejected from upstream line, i.e., when every neck gripper 260 of the carrier link conveyor 26B holds a container V. In FIG. 20(a), FIG. 21(a) and FIG. 22(b), twelve containers V1-V12 are carried by the carrier link conveyor 26B and each of the containers V1-V12 is received by respective servo wheels 28D, 28E and 28F.

When all of the neck grippers 260 of the carrier link conveyor 26B carry the containers V continuously, the movement of four vertical grippers 280 provided on each of the servo wheels 28D, 28E and 28F are controlled in accordance with the movement of the corresponding containers V carried by the carrier link conveyor 26B. Each of the servo wheels 28D, 28E and 28F, in the order of the wheels from the upstream side, receives every third container V from the carrier link conveyor 26B. Namely, the servo wheel 28D disposed farthest upstream, which is illustrated in FIG. 20(a), receives every third container V1, V4, V7 and V10 from the carrier link conveyor 26B. The servo wheel 28E disposed on the second upstream position, which is illustrated in FIG. 21(a), receives every third container V2, V5, V8 and V11 from the carrier link conveyor 26B. Further, the servo wheel 28F disposed farthest downstream, which is illustrated in FIG. 22(a), receives every third container V3, V6, V9 and V12 from the carrier link conveyor 26B.

FIGS. 20(b), 20(c), FIGS. 21(b), 21(c) and FIGS. 22(b), 22(c) illustrate the arrangement of the vertical grippers 280 of each servo wheel 28D, 28E and 28F when an empty neck gripper 260 exists in the carrier link conveyor 26B.

FIG. 20(b) and FIG. 20(c) illustrate an example when the container V10 is missing from the containers V1-V12. In FIG. 20(b), the vertical gripper 280 of the servo wheel 28D that should receive the container V10 in the normal condition, which is illustrated in FIG. 20(a), advances from the normal position and grips the container V9, which should be received by the servo wheel 28F in the normal condition, so that the container V9 is pulled out from the neck gripper 260 of the carrier link conveyor 26B. Furthermore, in FIG. 20(c), the vertical gripper 280 of the servo wheel 28D that should receive the container V10 in the normal condition, which is illustrated in FIG. 20(a), is retracted from the normal position and grips the container V11, which should be received by the servo wheel 28E in the normal condition, so that the container V11 is pulled out from the neck gripper 260 of the carrier link conveyor 26B.

In FIG. 21(b) and FIG. 22(b), the vertical gripper 280 of each servo wheel 28E and 28F is advanced from the normal position and the container V is gripped and pulled out from the neck gripper 260 of the carrier link conveyor 26B. In FIG. 21(c) and FIG. 22(c), the vertical gripper 280 of each servo wheel 28E and 28F is retracted from the normal position and the container V is gripped and pulled out from the neck gripper 260 of the carrier link conveyor 26B.

As described in the present embodiment, the servo wheels 28D, 28E and 28F that can separately drive a plurality of the vertical grippers 280 are arranged along the conveyance route of the carrier link conveyor 26B so that the containers V can be uniformly delivered to the servo wheels 28D, 28E and 28F by controlling the movement of the vertical grippers 280 even if any neck grippers 260 of the carrier link conveyor 26B are not carrying a container V. The controller 16 uses the sensor 17 to monitor the quantity of containers V transferred from the outlet conveyor 14D, 14E and 14F while using sensor 19 to monitor whether the neck grippers 260 of the carrier link conveyor 26B are holding containers V.

For example, when it is determined that the quantity of containers V transferred to the outlet conveyor 14D via the servo wheel 28D is less than the quantity of containers V transferred to the outlet conveyor 14E or 14F and when a container V that is intended to be supplied to the servo wheel 28D is missing, the controller 16 instructs the servo wheel 28D to extract a container V that was intended to be supplied to the servo wheel 28E or 28F in the normal condition, and instead supply the container V to the outlet conveyor 14D via the second pitch converting wheel 30B. Note that, the servo wheel 28D preferentially extracts a container V intended to be supplied to either of the servo wheel 28E or the servo wheel 28F based on which servo wheel had more containers V supplied.

When the quantity of containers V supplied to the outlet conveyor 14E through the servo wheel 28E is less than the quantities supplied to the outlet conveyors 14D and 14F and the container V to be supplied to the servo wheel 28E is missing, the servo wheel 28E extracts a container V intended to be supplied to the servo wheel 28D and the controller 16 instructs the servo wheel 28D not to extract the container with the vertical gripper 280. At the same time, the controller 16 instructs the servo wheel 28E to move the vertical gripper 280 along with the movement of the container V that was not extracted by the servo wheel 28D and extract that container V, as illustrated in FIG. 21(b). Furthermore, when extracting by servo wheel 28E the container V that had been intended to be supplied to the servo wheel 28F, the controller 16 instructs the vertical gripper 280 to be moved along with the movement of the container V, which is to be extracted by the servo wheel 28F, and extract that container V, as illustrated in FIG. 21(c).

When the quantity of containers V supplied to the outlet conveyor 14F through the servo wheel 28F is less than those supplied to the outlet conveyors 14D and 14E and a container V to be supplied to the servo wheel 28F is missing, the servo wheel 28F extracts a container V that was intended to be supplied to the servo wheel 28F and the controller 16 instructs the servo wheel 28E not to extract the container with the vertical gripper 280. At the same time, the controller 16 instructs the servo wheel 28F to move the vertical gripper 280 along with the movement of the container V that was not extracted by the servo wheel 28E and extract that container V, as illustrated in FIG. 21(b). Further, when extracting by servo wheel 28F the container V that had been intended to be supplied to the servo wheel 28D, the controller 16 instructs the servo wheel 28D not to extract the container with the vertical gripper 280. At the same time, the controller 16 instructs the servo wheel 28F to move the vertical gripper 280 along with the movement of the container V that was not extracted by the servo wheel 28D and extract that container V, as illustrated in FIG. 21(c).

As described above, according to the present embodiment, the capped containers can be conveyed by alternately gripping the neck and top and bottom of container. Thereby, it can be easily handled with a simple operation even when the type or size of the handling container (the shape or the size of the body) is changed.

Furthermore, according to the present embodiment, the containers can be delivered to a plurality of routes even when the wheel conveyors are applied. Moreover, in the present embodiment, the rotating direction and the combination of neck grippers and vertical grippers can be changed by providing the hold change wheel. Also, in the present embodiment, approximately the same number of containers can be supplied to each of the separate routes.

Figure 23:
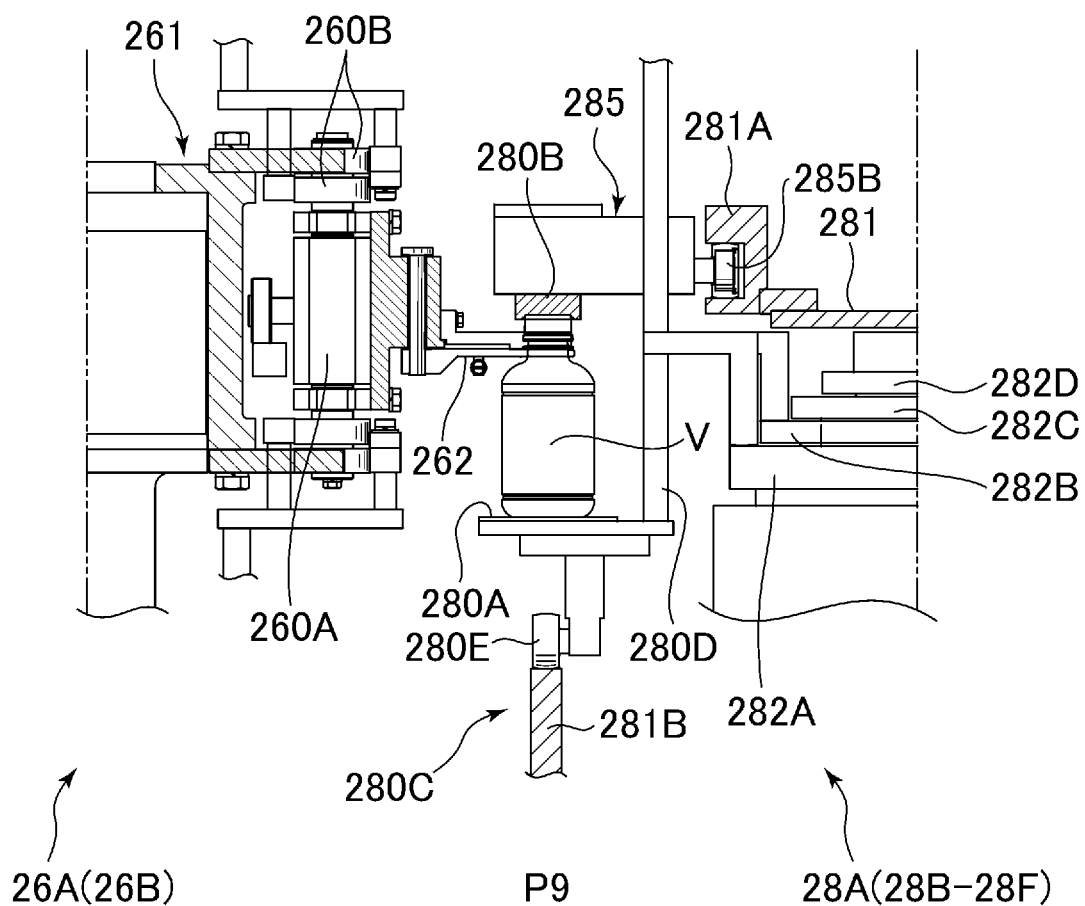
FIG. 23 is an enlarged partial side sectional view of the carrier link conveyor and the servo wheel around the container transfer position P9 when the vertical gripper of the servo wheel grips the container in an alternate embodiment.

Next, with reference to FIG. 23, an alternate embodiment of the present embodiment is explained. In the aforementioned embodiment, the lift mechanism 264 is applied to the neck gripper 260 of the carrier link conveyors 26A and 26B. However, in the alternate embodiment, the lift mechanism is applied to the support plate 280A of the servo wheel 28A-28F instead of the lift mechanism 264. Note that, components similar to those of the aforementioned embodiment are indicated by the same reference number and their explanations are omitted.

FIG. 23 is a partially enlarged sectional view of the carrier link conveyor 26A (26B) and the servo wheel 28A (28B) around the container transfer position P9 when the vertical gripper 280 of an alternate servo wheel 28A (28B-28F) holds the container V. As illustrated in FIG. 23, the lift mechanism 264, which is illustrated in FIGS. 15 and 16, is not provided. Instead, a plate lift mechanism 280C of the support plate 280A is provided.

The support plate 280A of the alternate embodiment is liftably attached to each of the drive shafts 282A-282D. Further, each of the support plates 280A is provided with a cam follower 280E. Each of the cam followers 280E abuts against a cam 281B that is provided along the outer circumference of the fixed shaft 281. The cam followers 280E are pressed against the cam 281B by their own weight and travel along the cam 281B as each of the drive shafts 282A-282D rotates. The cam 281B raises the cam followers 280E at the container transfer position P9 and abuts against the base of the container V, which is gripped by the neck gripper 260 of the carrier link conveyor 26B. According to the above-mentioned configuration, the same effect as the aforementioned embodiment can be obtained.

Note that, although in the present embodiments the number of containers delivered to each of the routes is estimated from the number of containers at the outlet conveyor, the number of the containers may also be counted directly at each route.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2018-087800 (filed on Apr. 27, 2018) and Japanese Patent Application No. 2018-109256 (filed on Jun. 7, 2018), which are expressly incorporated herein, by reference, in their entirety.

The invention claimed is:

1. A container conveyor system, comprising:
a neck-gripping endless conveyor provided with a plurality of neck grippers configured to hold a neck of a capped container below a flange, wherein the neck-gripping endless conveyor includes closures that open and close the neck grippers, and the neck-gripping endless conveyor conveys the container, which is suspended and held by a corresponding one of the neck grippers, by moving the corresponding one of the neck grippers;
a vertical-gripping endless conveyor provided with a plurality of vertical grippers that comprises an upper grip member, which is liftable and configured to abut against the top of the cap of the container, and a support plate that supports the base of the container, wherein the vertical-gripping endless conveyor conveys the container held by the upper grip member and the support plate by moving a corresponding one of the vertical grippers;
the conveyor system further comprising one of:
(i) a plurality of additional vertical-gripping endless conveyors arranged adjacent to the neck-gripping endless conveyor, and
(ii) a plurality of additional neck-gripping endless conveyors arranged adjacent to the vertical-gripping endless conveyor; and
wherein the container conveyor system conveys the container by holding and delivering the container via a plurality of routes and by transferring the container between the corresponding one of the neck grippers and the corresponding one of the vertical gripper.

2. The container conveyor system according claim 1, wherein the neck grippers are liftably provided on the neck-gripping endless conveyor, and the neck-gripping endless conveyor comprises a resilient member that biases the corresponding one of the neck grippers upward; and
when the container held by the corresponding one of the neck grippers is handed over to the corresponding one of the vertical grippers of the vertical gripping endless conveyor, the container held by the corresponding one of the vertical grippers is lowered as the upper grip member pushes down on the top of the container cap, thereby the base of the container is placed on the support plate.

3. The container conveyor system according to claim 2, further comprising a mixed-gripper endless conveyor provided adjacent to at least one of the plurality of additional vertical-gripping endless conveyors,
the mixed-gripper endless conveyor comprising:
a set of neck grippers that grips below the flange of the container;

a set of vertical grippers having an upper grip member, which is liftable and abuts against the top of the cap of the container, a lift mechanism that raises and lowers the upper grip member, and a support plate that supports the base of the container; and a gripper operator configured to move a corresponding one of the set of neck grippers between a gripping position at which the corresponding one of the set of neck grippers holds the container and a release position that is spaced apart from the container, wherein a corresponding one of the set of vertical grippers is provided at a position corresponding to the corresponding one of the set of neck grippers;

wherein the container is gripped by the corresponding one of the set of neck grippers, which is moved to the gripping position, upon receiving from an additional vertical gripper of at least one of the plurality of additional vertical-gripping endless conveyors, and wherein the corresponding one of the set of vertical grippers also grip the container such that the container is gripped by both the corresponding one of the set of neck grippers and the corresponding one of the set of vertical grippers of the mixed-gripper endless conveyor, wherein the corresponding one of the set of neck grippers is moved to the release position whereby the container is handed over to the corresponding one of the set of vertical grippers.

4. The container conveyor system according to claim 2, further comprising a mixed-gripper endless conveyor provided adjacent to the at least one of the plurality of additional neck-gripping endless conveyors, the mixed-gripper endless conveyor comprises:

a set of vertical grippers having an upper grip member, which is liftable and abuts against the top of the cap of the container, a lift mechanism that raises and lowers the upper grip member, and a support plate that supports the base of the container;

a set of neck grippers that grips below the flange of the container;

a gripper operator configured to move a corresponding one of the set of neck grippers between a gripping position at which the corresponding one of the set of neck grippers holds the container and a release position that is spaced apart from the container, wherein a corresponding one of the set of neck grippers is provided at a position corresponding to the corresponding one of the set of vertical grippers;

wherein the container is gripped by the corresponding one of the set of vertical grippers, which is moved to the gripping position, upon receiving from an additional neck gripper of at least one of the plurality of additional neck-gripping endless conveyors, and the corresponding one of the set of neck grippers also gripping the container such that the container is gripped by both the corresponding one of the set of vertical grippers and the corresponding one of the set of neck grippers of the mixed-gripper endless conveyor, wherein the corresponding one of the set of vertical grippers is moved to the release position whereby the container is handed over to the corresponding one of the set of neck grippers.

5. The container conveyor system according to claim 1, further comprising a mixed-gripper endless conveyor provided adjacent to at least one of the plurality of additional vertical-gripping endless conveyors, the mixed-gripper endless conveyor comprising:

a set of neck grippers that grips below the flange of the container;

a set of vertical grippers having an upper grip member, which is liftable and abuts against the top of the cap of the container, a lift mechanism that raises and lowers the upper grip member, and a support plate that supports the base of the container; and a gripper operator configured to move a corresponding one of the set of neck grippers between a gripping position at which the corresponding one of the set of neck grippers holds the container and a release position that is spaced apart from the container, wherein a corresponding one of the set of vertical grippers is provided at a position corresponding to the corresponding one of the set of neck grippers;

wherein the container is gripped by the corresponding one of the set of neck grippers, which is moved to the gripping position, upon receiving from an additional vertical gripper of at least one of the plurality of additional vertical-gripping endless conveyors, and wherein the corresponding one of the set of vertical grippers also grip the container such that the container is gripped by both the corresponding one of the set of neck grippers and the corresponding one of the set of vertical grippers of the mixed-gripper endless conveyor, wherein the corresponding one of the set of neck grippers is moved to the release position whereby the container is handed over to the corresponding one of the set of vertical grippers.

6. The container conveyor system according to claim 1, further comprising a mixed-gripper endless conveyor provided adjacent to the at least one of the plurality of additional neck-gripping endless conveyors, the mixed-gripper endless conveyor comprises:

a set of vertical grippers having an upper grip member, which is liftable and abuts against the top of the cap of the container, a lift mechanism that raises and lowers the upper grip member, and a support plate that supports the base of the container;

a set of neck grippers that grips below the flange of the container;

a gripper operator configured to move a corresponding one of the set of neck grippers between a gripping position at which the corresponding one of the set of neck grippers holds the container and a release position that is spaced apart from the container, wherein a corresponding one of the set of neck grippers is provided at a position corresponding to the corresponding one of the set of vertical grippers;

wherein the container is gripped by the corresponding one of the set of vertical grippers, which is moved to the gripping position, upon receiving from an additional neck gripper of at least one of the plurality of additional neck-gripping endless conveyors, and the corresponding one of the set of neck grippers also gripping the container such that the container is gripped by both the corresponding one of the set of vertical grippers and the corresponding one of the set of neck grippers of the mixed-gripper endless conveyor, wherein the corresponding one of the set of vertical grippers is moved to the release position whereby the container is handed over to the corresponding one of the set of neck grippers.

* * * * *